US006862486B2

United States Patent
Cocco et al.

(12) United States Patent
(10) Patent No.: US 6,862,486 B2
(45) Date of Patent: Mar. 1, 2005

(54) SYSTEM AND METHOD FOR PROCESSING DATA RELATING TO CONDITIONS IN A MANUFACTURING PROCESS

(75) Inventors: Dennis Pio Cocco, London (CA); Victoria Louisa Cocco, London (CA); Samir Sehovic, London (CA); Jianrong Cui, London (CA)

(73) Assignee: ActivPlant Corporation, London (CA)

( * ) Notice: Subject to any disclaimer, the term of this patent is extended or adjusted under 35 U.S.C. 154(b) by 80 days.

(21) Appl. No.: 10/377,731

(22) Filed: Mar. 4, 2003

(65) Prior Publication Data

US 2004/0176864 A1 Sep. 9, 2004

(51) Int. Cl.[7] .............................................. G06F 19/00
(52) U.S. Cl. ............................ 700/95; 700/12; 700/14; 700/15; 700/27; 707/100
(58) Field of Search .............................. 700/12, 14, 15, 700/16, 27, 90, 95, 96, 100, 101, 108, 305; 707/100

(56) References Cited

U.S. PATENT DOCUMENTS 5,661,653 A * 8/1997 Kulik ........................ 705/410

2002/0188366 A1 * 12/2002 Pepper et al. ............... 700/108

* cited by examiner

*Primary Examiner*—Leo Picard
*Assistant Examiner*—Sean Shechtman

(57) ABSTRACT

The invention provides a system and method for processing data relating to conditions in a manufacturing process. The system and method provide a time based relationship between data items of the data collected in a manufacturing process. More abstract and different data models may be defined enabling application of these data models in different systems without having to define the new models from the basic data items for each system. The system and method provide an identifier data type that allows association of a meaningful identifier with a time interval and a source. The identifier is associated with other data items through the relationship of time interval and source. Values of the identifier are dynamically defined and relate to either identity of an article being processed during the time interval or a status of the manufacturing process during the time interval.

40 Claims, 11 Drawing Sheets

SYSTEM AND METHOD FOR PROCESSING DATA RELATING TO CONDITIONS IN A MANUFACTURING PROCESS

FIELD OF THE INVENTION

The invention relates to a system and method for processing data relating to conditions in a manufacturing process.

BACKGROUND OF THE INVENTION

A manufactured product is typically assembled and packaged through a series of activities on the manufacturer's plant floor in an assembly line setting. Such activities may include fabricating or stamping parts, assembling parts into larger parts and packaging parts. Each activity in the assembly line is typically carried out by a separate machine, part of a machine or group of machines. For example, three machines in a welding assembly line may be involved in welding two parts together, one for loading the parts to be welded, another to weld the parts and a third to unload the parts.

A manufacturer may want to collect data regarding the conditions in the manufacturing process for a machine, part of machine or group of machines to manage and improve manufacturing processes. Such data can include any number of monitored conditions for a machine such as temperature of the part processed by the machine, maximum torque, number of items processed, identification of a fault, identification of idle time, among other things. For example, management may track the amount of idle time a machine experiences and the reasons therefor to determine how to decrease the amount. Or, management may track the number of parts processed to forecast output of the assembly line. To provide this data, typically a device is connected to each machine, part of a machine or group of machines to track and record this data.

Referring to FIG. 1, a typical configuration of a prior art data collection system 100 for tracking such data on plant floor 130 is shown. In such a system 100, data is typically collected for each asset 104 on plant floor 130. An asset 104 is a piece of equipment that is capable of functioning independently from other pieces of equipment and is grouped according to whether all aspects of the asset 104 have the same state, e.g. faulted, idle, starved, at a given time for the same reason. Asset 104 may correspond to a machine, a group of machines or even a part of a machine on plant floor 130.

Data collection system 100 comprises Programmable Logic Controller (PLC) 106, data collector 112, data display module 126 and database 116. Typically, data collector 112 includes an OLE for process control (OPC) server 132 for receiving data from PLCs 106 for eventual storage in database 116. OPC is a standardized protocol for communicating data between systems in a controlled process and its functionalities. The OPC protocol is described in greater detail later.

PLC 106 is a programmable device for accumulating identified data from one or more machines on plant floor 130. Typically, a PLC 106 also controls the operation of its associated asset 104. PLC 106, connected to asset 104 via link 108, contains one or more memory registers 110 to collect data from its associated asset 104. Internal logic of PLC 106 populates its memory registers 110 with data regarding monitored conditions of asset 104. Each memory register 110 records data associated with a separate monitored condition of asset 104. For example, one memory register 110 records the number of items processed by asset 104 while another records the temperature of the part processed by asset 104. Although PLC 106 is shown in FIG. 1 connected to asset 104 through link 108, it will be appreciated that PLC 106 may be integrated with asset 104 providing direct connection between memory registers 110 and the means of gathering the data stored therein.

PLC 106 further connects to OPC server 132 in data collector 112 via link 114. Preferably, data collector 112 is physically located on plant floor 130, however, it may be located almost anywhere, as long as appropriate communications are maintained by link 114. OPC server 132 collects and formats data stored in memory registers 110 of each PLC 106 connected thereto and provides the standardized data to the other modules of data collector 112. Data collector 112 formats the collected data for storage in database 116 and provides it to database 116 via link 114. Although data collector 112 is shown in FIG. 1 connected to PLC 106 via link 114 and to database 116 via link 118, it will be appreciated that data collection may be manually undertaken such that the data from PLC 106 is manually collected and entered into database 116. It will be appreciated that data collector 112 can be embodied in computer software, computer hardware, firmware, among other things or combinations thereof. It will also be appreciated that data collector 112 may use other methods of collecting data from PLCs 106 rather than through OPC server 132 shown.

Database 116 stores configuration information for system 100 concerning the data collected and the data retrieved by data collector 112.

Once database 116 receives the data collected from PLC 106, an operator can access the data using a computer or terminal 120 connected to database 116 via data display module 126 and links 122 and 124. The operator can query database 116 to form the data into meaningful information for use in analysis of the throughput of plant floor 130. Data display module 126 obtains data from database 116 and formats it into reports or queries for the user. Preferably, computer or terminal 120, from which users access data in database 116 through data display module 126, does not form part of system 100 and may be located almost anywhere as long as appropriate communications are maintained by link 124. Data display module 126 provides a mechanism for a user of system 100 to access and analyze data stored in database 116.

It will be appreciated that although one data collector 112 is shown connected to one PLC 106, a typical system 100 may comprise more than one data collector 112 and have one or more PLCs 106 connected to each data collector 112.

Prior art systems typically utilize data elements which are very closely related to operating indices of an asset 104, e.g. temperature of a processed part or count. Such systems lack more abstract and different data models enabling application of these data models in different systems without having to define the new models from the basic data elements for each system. There is a need for a system and method having a data model to provide relationships between data types overcoming these disadvantages.

SUMMARY OF THE INVENTION

In a first aspect, a method of processing data relating to conditions in a manufacturing process is provided. The data is relateable to a data type. The method includes the steps of:

relating a first data item of the data to a first data type;

associating the first data item with a first time marker;

associating the first data item with a source in the manufacturing process;
associating the first data item with an identifier, the value of the identifier being capable of being one of a set of values, each value in the set relating to a condition, the set being expandable during operation of the manufacturing process;
relating a second data item of the data to a second data type;
associating a second data item with a second time marker;
associating the second data item with a source in the manufacturing process; and
upon a receiving a request, associating the value of the identifier associated with the first data item with the second data item if:
the first time marker associated with the first data item corresponds to the second time marker associated with the second data item; and
the source associated with the first data item corresponds to the source associated with the second data item.

The value of the identifier indicates either identity of an article processed during a first time interval indicated by the first time marker or a status of the manufacturing process during the first time interval indicated by the first time marker.

The value of the identifier may indicate that the article processed during the first time interval is one of a part processed, a batch of parts processed or a model processed.

The value of the identifier may indicate a status of the manufacturing process during the first time interval, the status being a shift identifier identifying a particular work shift in which parts are processed.

The first time marker may indicate a start time for the first time interval.

The first time marker may further indicate an end time for the first time interval, the start time and the end time indicating a duration of the first time interval.

The second time marker may indicate either a point in time or a second time interval.

The second time marker may be the point in time and the first time marker may correspond to the second time marker if the point in time occurs within the first time interval.

The second time marker may be the second time interval and the first time marker may correspond to the second time marker if at least a portion of the second time interval occurs within the first time interval.

The second data type may be one of:
a) an accumulator data type, the second time marker may be the second time interval and the method may further include the step of associating the second data item with an accumulator value, the accumulator value relating to a count for the second time interval;
b) an event data type, the second time marker may be the point in time and the method may further include the step of associating the second data item with an event value, the event value relating to a process variable for the point in time; and
c) an incident data type, the second time marker may be the second time interval and the method may further include the step of associating the second data item with an incident value, the incident value relating to an incident occurring in the second time interval.

The second data type may be an incident data type and the method may further include the step of associating a priority level to the incident value to prioritize the second data item against another data item of the second data type associated with data relating to a condition in the manufacturing process.

The source may be a machine, a portion of a machine or a group of machines in the manufacturing process.

The method may further include the step of storing the first data item and the second data item in a database prior to requesting the association between the value of the identifier and the second data item.

The first data item and the second data item may be stored as records in tables in the database.

The method may further associate a priority level to the value of the identifier to prioritize the first data item against another first data item associated with data relating to a condition in the manufacturing process.

The method may have the first data type further providing a link to another data type of the data types to allow data in the another data type to be associated with data in the first data type.

The method may further include the step of, in response to the request, accessing the database using SQL queries to associate the value of the identifier and the second data item upon receiving the request.

The method may further include the step of dynamically displaying association of the value of the identifier with the second data item on a graphical user interface connected to the database upon receiving the request.

The method may further include the step of collecting the data relating to the first data item and the second data item by at least one Programmable Logic Controller (PLC) in the manufacturing process.

The method may further include the step of collecting the data from the Programmable Logic Controller and formatting the data prior to relating the first data item and the second data item to the first data type and the second data type respectively.

In a second aspect, a system for processing data relating to conditions in a manufacturing process is provided. The data is relateable to a data type. The system includes:
a data type relation module adapted to receive a first data item of the data and a second data item of the data and to relate the first data item to a first data type and the second data item to a second data type;
a first data type module adapted to receive the first data item from the data type relation module, to associate the first data item with (i) a first time marker, (ii) a source in the manufacturing process and (iii) an identifier, the value of the identifier to be one of a set of values relating to a condition of said conditions, the set being expandable during operation of the manufacturing process, the first data type module further adapted to process the set when expanded;
a second data type module receiving the second data item from the data type relation module and to associate a second data item with a second time marker and a source in the manufacturing process;
a database adapted to communicate with the first data type module and the second data type module and to store the first data item and the second data item; and
an output module connected to the database adapted to receive a request and to associate the value of the identifier associated with the first data item with the second data item if:
the first time marker associated with the first data item corresponds to the second time marker associated with the second data item; and the source associated with the first data item corresponds to the source associated with the second data item, The value of the identifier indicates one of:
a) identity of an article processed during a first time interval indicated by the first time marker; and
b) a status of the manufacturing process during the first time interval indicated by the first time marker.

In a third aspect, a system for processing data relating to conditions in a manufacturing process is provided. The data is relateable to data types including an identifier data type, an accumulator data type, an event data type and an incident data type. Each data type includes an association with a time marker and a source in the manufacturing process. The system comprises a data type relation module, an identifier data type module, an event data type module, an incident data type module, an accumulator data type module, a data processing module, a database and an output module. The data type relation can receive the data and process it into one of the data types. The identifier data type module can receive the data from the data type relation module if the data is related to the identifier data type, can associate a value of an identifier associated with the identifier data type with one value of a plurality values in a set relating a selection of the conditions to the identifier date type, can provide expansion of the set during operation of the manufacturing process, can process the set when expanded and can prepare the data for storage. The accumulator data type module can receive the data from the data type relation module if the data is related to the accumulator data type and can prepare the data for storage. The event data type module can receive the data item from the data type relation module if the data is related to the event data type and can prepare the data for storage. The incident data type module can receive the data item from the data type relation module if the data is related to the incident data type and can prepare the data for storage. The data processing module can receive the data for storage from each of the data type modules and can generate a request to store the data for storage. The database can receive the request and can store the data for storage related to the request in a data structure. The output module can receive a query relating to identifying data associated with the identifier data type and can process the query by associating a value of an identifier associated with the identifying data with a second data item, the second data item being one of the accumulator, event and incident data types. The association is made if a time marker associated with the identifying data corresponds to a time marker associated with the second data item and if a source associated with the identifying data corresponds to a source associated with the second data item. The value of the identifier indicates an identity of an article processed during an identifying time interval associated with a time marker related to the identifying data or a status of the manufacturing process during the identifying time interval.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
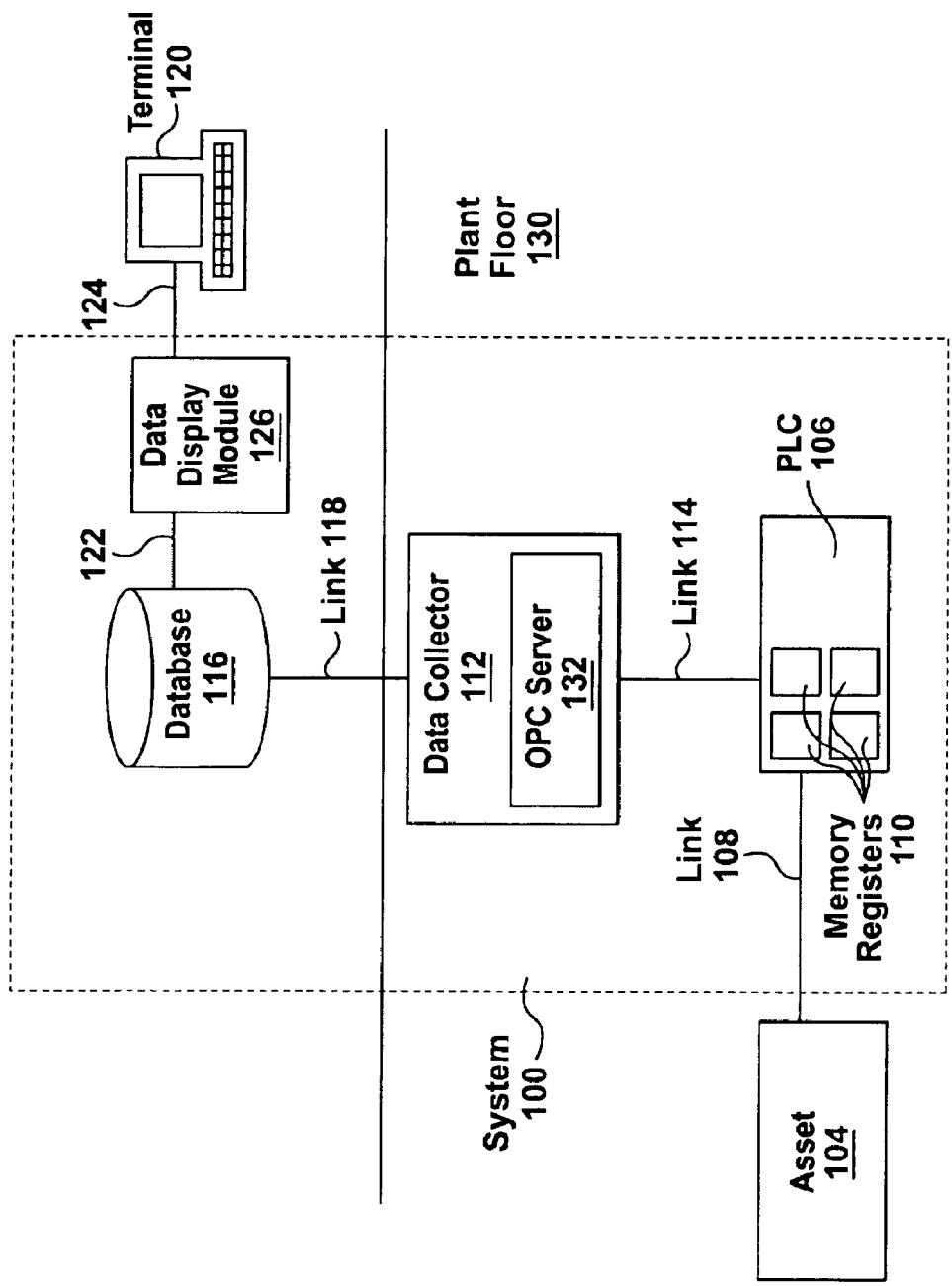
FIG. 1 is a block diagram of a data collection system of the prior art.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Briefly, the system and method of the embodiment described provide a time based relationship between data items of the data collected in a manufacturing process allowing for more abstract and different data models enabling application of these data models in different systems without having to define the new models from the basic data items for each system. Specifically, the system and method provide an identifier data type that allows association of a meaningful identifier with a time interval and a source. The identifier is associated with other data items through the relationship of time interval and source. Values of the identifier are dynamically defined in the system and method of the embodiment.

Figure 2:
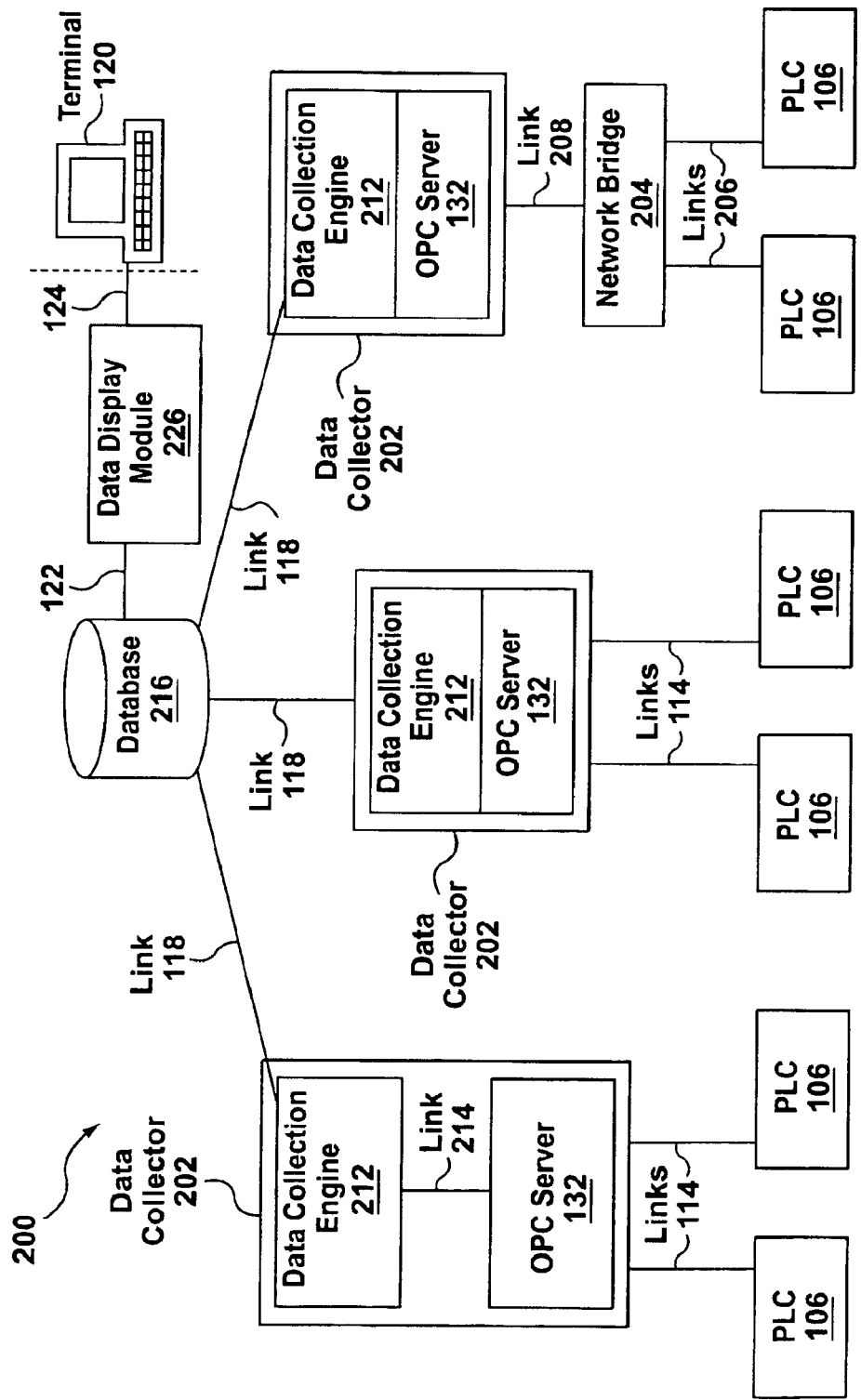
FIG. 2 is a block diagram of a data collection system of an embodiment of the invention.

Referring to FIG. 2, a data collection system 200 of an embodiment is shown. System 200 has a plurality of PLCs 106, data collector 202, data display module 226 and database 216. PLCs 106 each have one or more memory registers 110. Data collector 202 of system 200 embodies the main features of the present invention and as such, differs in many aspects from data collector 112 of the prior art.

In system 200, each PLC 106 may be directly connected to its data collector 202 via a communication link 114 or may be connected to its data collector 202 via a network bridge 204 and links 206 and 208. Data collectors 202 are in turn connected to database 216, via links 118, which stores collected data. As with system 100 of the prior art, computer or terminal 120 providing access to data stored in database 216 through data display module 126 preferably does not form part of system 200.

Each data collector 202 of system 200 comprises an OPC server 132 and data collection engine 212. OPC is a standardized protocol for communicating data between systems in a controlled process and its functionalities. Operation of the OPC protocol is known to a relevant person skilled in the art. OPC server 132 and data collection engine 212 of data collector 202 may both reside in the same part of the network running system 200 or they may reside in different parts of the network and communicate via link 214. It will be appreciated that there are numerous configurations for connection of OPC server 132 and data collection engine 212 for communication in system 200.

OPC server 132 and data collection engine 212 operate together to collect data from PLCs 106 and store the data in database 216. Each PLC 106 is linked to its associated OPC server 132 which collects the data stored in its memory registers 110. Typically, OPC server 132 collects such data by periodically reading memory registers 110, commonly at a rate of once per second. OPC server 132 stores the read data in its internal memory in a standardized manner along with source information indicating the memory register 110 and asset 104 from which the data was collected. Data collection engine 212 is provided the data and source information in the standardized manner, allowing it to properly interpret and process the data collected. OPC server 132 therefore provides a standardized data access interface for data collection engine 212 to request and receive data from memory registers 110. Collection and format of data stored in internal memory of OPC server 132 are known to those skilled in the art.

PLC 106 and/or OPC server 132 can be configured so that the value of a particular memory register 110 causes OPC server 132 to forward the standardized data to data collection engine 212. Such data collection by data collection engine 212 is referred to as triggered or unsolicited data collection. Data collection engine 212 may further analyze and format the data for storage in database 216. While data preferably provided to data collection engine 212 by OPC server 132 is a data "push" model, data collection engine 212 may also "pull" data from OPC server 132. Such requests are typically forwarded to OPC server 132 which collects the appropriate data from its internal memory and returns the collected data to data collection engine 212 again in the standardized format. Such data collection by data collection engine 212 is referred to as non-triggered or solicited data collection. Again, data collection engine 212 may further analyze and format the data for storage in database 216. Further detail on the operation of data collection engine 212 is provided below.

In the embodiment, data collection engine 212 receives data items from OPC server 132. Each data item includes data retrieved from a memory register 110 indicating a value of a monitored condition of a PLC 106, information regarding the source of the data item (i.e. asset 104) and may also include time information about the data which is provided by OPC server 132.

The embodiment provides a series of data element types which can be used to characterize "raw" data in different contexts. In the embodiment, raw data elements, such as counts, temperature, etc., can be processed individually or can be grouped together to be associated with a new abstraction of a data element. A series of new data abstractions provides higher level data templates which can be used in different systems, thereby facilitating installation and programming of a control system for a process being monitored. As such, the raw data may be used in several different data elements to highlight different process-related properties associated with the data.

As such, data collection engine 212 of the embodiment relates data items received from OPC server 132 with one of four data types namely accumulator data, incident data, event data and identifier data. Before system 200 collects a data item from a memory register 110, an operator configures that data item as one of these four data types. Data collection engine 212 stores the collected accumulator data, incident data, event data and identifier data, or information derived therefrom, as records in one or more tables in database 216. In system 200 of the embodiment, separate table structures are provided for each of the four data types. For each data type, there is either an explicit or implicit association of a time marker with each record. Each of the data types are described in turn.

First, accumulator data typically tracks counts and aggregate times collected over a time interval. Accumulator data may include a number parts processed by an asset in a time interval (count), a number parts rejected by an asset in a time interval (count) or total idle time of machine during a time interval (time). Number counts and time counts can be generalized as a count during a time interval.

Typically, the timer or counter embodied in the appropriate memory register 110 of PLC 106 for collecting accumulator data will increment to a pre-set roll-over value and then reset to zero. Either PLC 106 or data collection engine 212 can measure accumulator data as a count or time in a time interval. If accumulator data is to be measured in PLC 106, the logic for the timer or counter needs to be programmed into PLC 106. For example, a memory register 110 may comprise a counter defined internally as an integer based value, which rolls-over to zero after reaching a count of 32,767 (i.e. $2^{15}$). If the previous count obtained from this memory register 110 was 30,000 and the current count is 5,000, the PLC 106 must contain the logic for determining that the number counted in the time interval is 7,768. However, the embodiment implements such logic by programming software in data collection engine 212 which provides a more flexible programming environment than programming a PLC 106.

Second, incident data typically tracks "incidents" for asset 104 having a start time, an end time and a duration. Incidents can include faults, alarms, warnings, e.g. starved, idle, backed up, faulted-door open, faulted-jammed, etc., of asset 104 generated when a monitored condition of an asset 104 switches from an "on" status to an "off" status or vice versa. Typically, a memory register 110 for collecting incident data comprises a binary status switch for which PLC 106 changes the value stored therein between zero and one when an incident starts and back again when the incident ends. For example, a memory register 110 records that an asset 100 is backed up by changing the value stored in memory register 110 from zero to one. When asset 100 ceases to be backed up, PLC 106 records a value of zero in memory register 110. Depending on the configuration of PLC 106 and OPC server 132, PLC 106 can either "push" this information to OPC server 132 when it senses the change of value or the change can be read or "pulled" from memory register 110 by the periodic update of internal memory of OPC server 132. OPC server 132 provides the incident data to data collection engine 212 which analyzes the data and may generate incident information based on the data. Development of incident information by data collection engine 212 is described in further detail below.

Third, event data is collected for memory registers 110 that provide a value for a process variable at a particular time, not over a time interval as in the case with accumulator data. Examples of event data process variables include temperature, torque and pressure. Events are instances of collecting such event data. Memory registers 110 which collect the value of process variables may be numeric or alphanumeric, depending on the type of event data collected.

Finally, identifier data tags specific time intervals in which an asset 104 in the production process operates as being associated with a specific identifier. The value of the identifier stored in database 216 is read from memory register 110 and so does not have to be pre-configured in system 200, i.e. it is dynamically defined. It will be appreciated that the set of values from which the value of the identifier is chosen is expandable at run time. This means that system 200 does not have to know all of the possible values for an identifier to correctly associate the time interval with this value.

The value of the identifier typically can indicate the identity of the article processed during the time interval or the status of the manufacturing process during the time interval. The value of the identifier can indicate that the article is a type of part processed, a batch of parts processed, a model processed and a particular article processed (serial number). The value of the identifier can alternately indicate that the status of the manufacturing process is a particular work shift in which parts are processed.

For example, a bar code scanner attached to PLC 106 scans batch identifiers or numbers for a part processed by a particular asset 104. System 200 is not pre-configured with the possible batch numbers processed by asset 104. While the same batch number is scanned at the particular asset 104, the time interval is associated with the batch number and an asset identifier. When PLC 106 scans a new batch number, the time interval associated with the previous batch number ends and a new time interval associated with the new batch number for asset 104 begins. Similarly to incidents, identifier data indicate a start time, an end time and a duration of the time interval associated with an identifier. Other identifiers not available through PLCs 106 may be manually entered into database 216 of system 200. For example, a user enters identifier data for a time interval corresponding to a shift to allow queries on the database 216 based on this time interval. Memory registers 110 which collect identifier data may be numeric or alphanumeric, depending on possible formats for the identifier.

Although four data types are used by data collection engine 212, it will be appreciated that other embodiments may categorize data into fewer, more or different data types. Each of the four data types provides record for a data item tracked by system 200. Each record for each data type can then be stored in database 216 and processed in different forms for any reports generated by system 200. Generally, the records may be processed as independent records, but the embodiment further provides the ability to make associations amongst records. While relationships can be built amongst the data types (as will be described later), having independent records with an associated time marker provides flexibility when processing and manipulating the records when analyzing the data.

The time marker associates each record for a data item with either a time interval (for accumulator data, incident data and identifier data) or a time of recordal (for event data). Establishing a relationship between the data types based on time avoids having to store additional records to record the relationship between data types. Without such a time relationship, separate records would have to be stored for the relationships between each piece of identifier, event, accumulator and incident data collected. For example, without the time relationship, when data collection engine 212 retrieves three pieces of event data ($e_1$, $e_2$ and $e_3$) from an asset 104 at a time when there are three active identifiers ($i_1$, $i_2$ and $i_3$) associated with asset 104, nine records are stored to record the relationship, i.e. three records for each piece of event data, as shown by table 1 below.

TABLE 1

|  | Event Data | Identifier Data |
| --- | --- | --- |
| Record 1 | $e_1$ | $i_1$ |
| Record 2 | $e_1$ | $i_2$ |
| Record 3 | $e_1$ | $i_3$ |
| Record 4 | $e_2$ | $i_1$ |
| Record 5 | $e_2$ | $i_2$ |
| Record 6 | $e_2$ | $i_3$ |
| Record 7 | $e_3$ | $i_1$ |
| Record 8 | $e_3$ | $i_2$ |
| Record 9 | $e_3$ | $i_3$ |

The time relationship allows identification of the active identifiers for the time associated with the collection of the event data. Given the same example with the time relationship, only six records are stored, one for each piece of identifier data and event data, each with an associated time as shown in Tables 2A and 2B below.

TABLE 2A

| Event Data Table | Event Data | Record Time |
| --- | --- | --- |
| Record 1 | $e_1$ | $t_d$ |
| Record 2 | $e_2$ | $t_e$ |
| Record 3 | $e_3$ | $t_f$ |

TABLE 2B

| Identifier Data Table | Identifier Data | Start Time | End Time |
| --- | --- | --- | --- |
| Record 4 | $i_1$ | $t_a$ | $t_g$ |
| Record 5 | $i_2$ | $t_b$ | $t_h$ |
| Record 6 | $i_3$ | $t_c$ | $t_i$ |

The time relationship also provides a simple method of relating the data types without having to hard-code those relationships when database 216 is defined. Therefore, system 200 may be readily implemented in any number of environments and situations since database 216 does not require customization.

As noted earlier, as a specific example of providing relationships between data types, system 200 provides a pre-set relationship between accumulator data and identifier data. This allows data collection engine 212 to determine when the value of the identifier, such as a batch number or a model number, changes which triggers collection of accumulator data for storage in database 216. Recording the value of a memory register 110 collecting accumulator data when the identifier changes allows a more accurate count of items that are associated with the previous identifier as apart from the current identifier.

Figure 3:
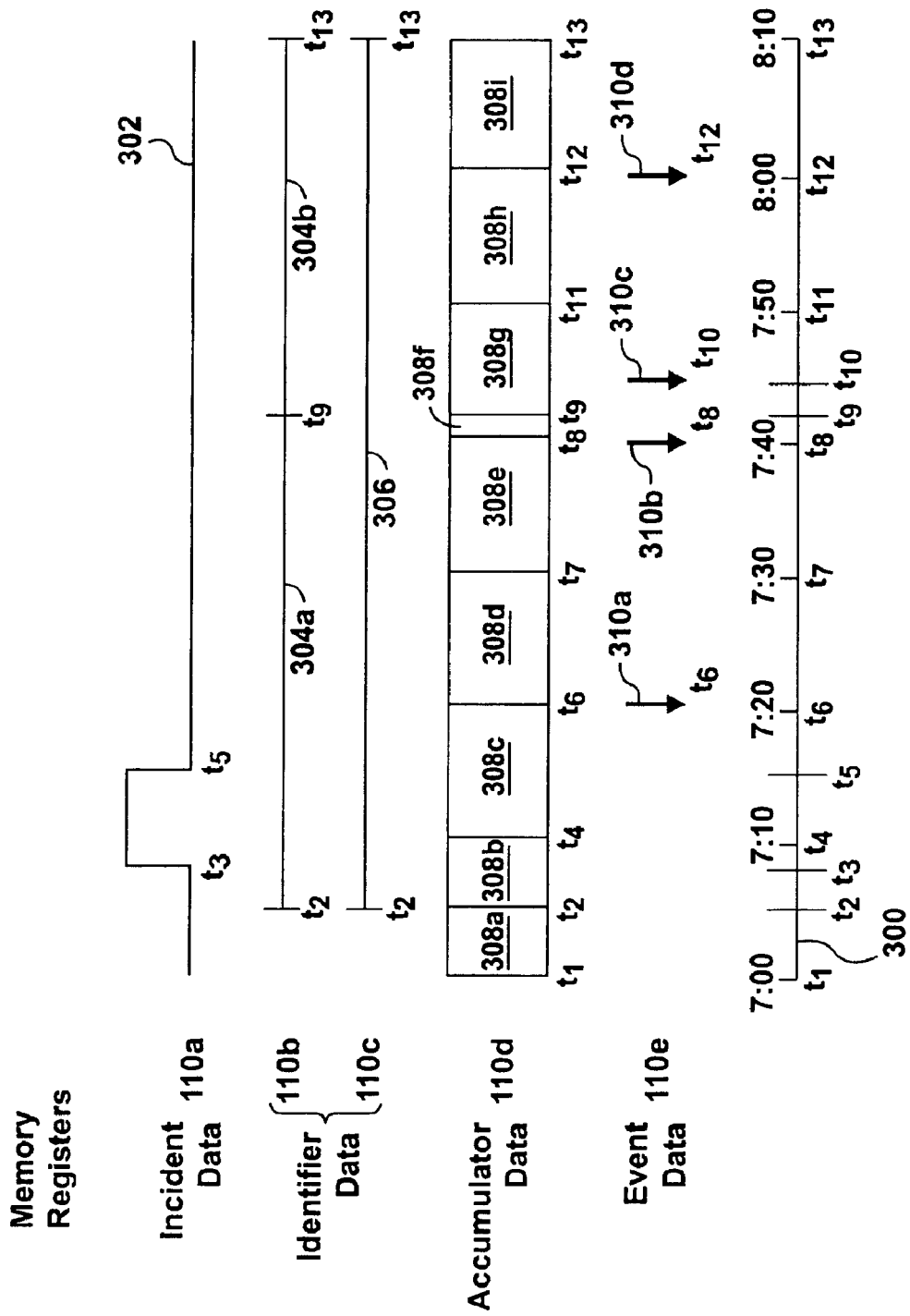
FIG. 3 is a graph illustrating an example of collecting data along a timeline with the system of FIG. 2.
Figure 4:
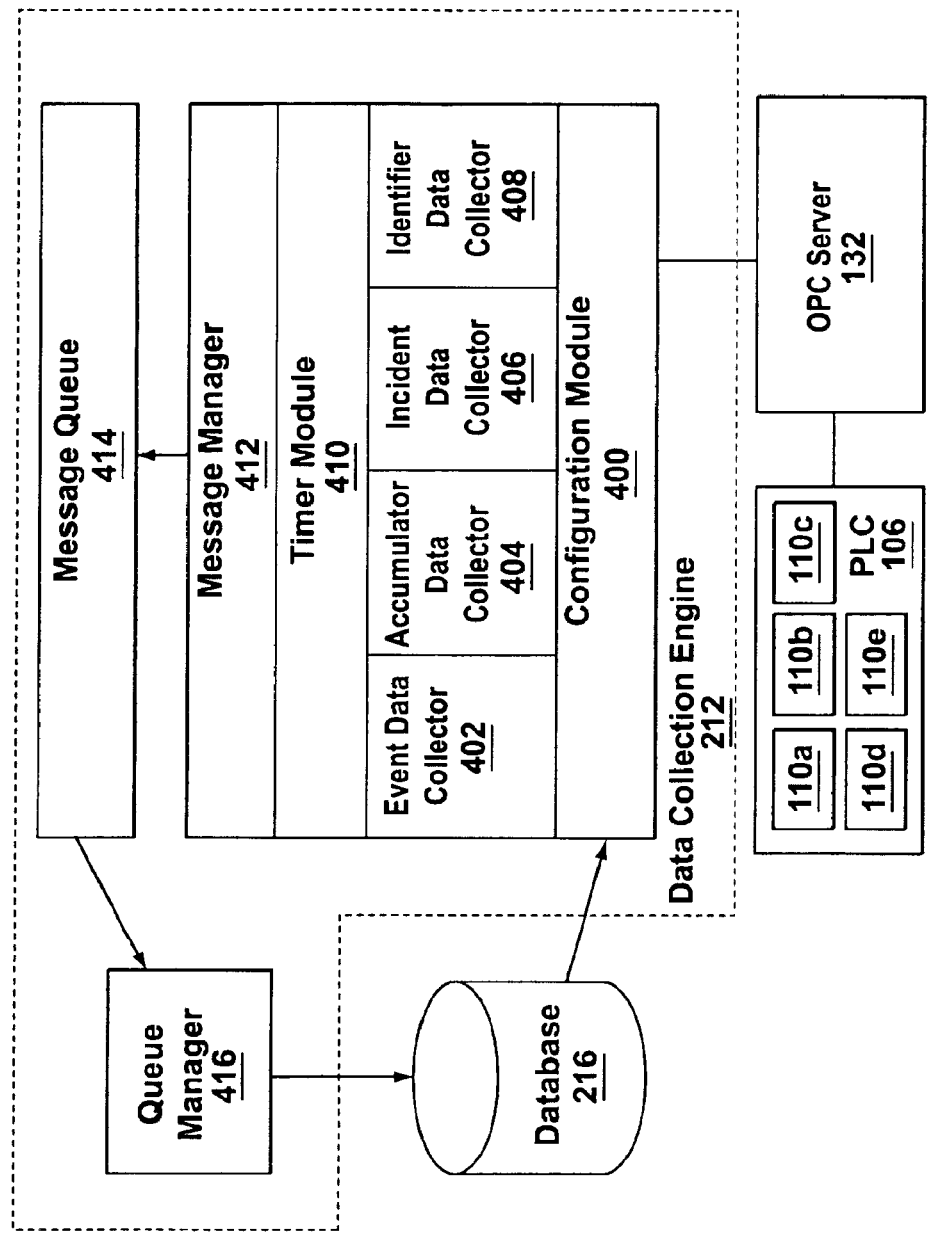
FIG. 4 is a block diagram of the system of FIG. 2 in greater detail.

Referring to FIGS. 3 and 4, an example of the collection of accumulator data, incident data, event data and identifier data is provided for data collection engine 212 shown in greater detail. Specifically, referring to FIG. 4, data collection engine 212 has a series of modules which each provide a separate function for data collection engine 212. Each module is adapted to communicate data, status or trigger information with other modules as needed. In particular, data collection engine 212 comprises configuration module 400, event data collector 402, accumulator data collector 404, incident data collector 406, identifier data collector 408, timer module 410, message manager 412, message queue 414 and queue manager 416.

Each data type configured in system 200 has a module for requesting and collecting data associated with that data type. Upon receiving a data item, the data type module associates it with a time marker and the source from which the data item is collected. Event data collector 402 requests solicited event data items and collects solicited and unsolicited event data items received by data collection engine 212. Accumulator data collector 404 requests solicited accumulator data items and collects solicited and unsolicited accumulator data items received by data collection engine 212. Incident data collector 406 collects unsolicited incident data items received by data collection engine 212. Identifier data collector 408 collects unsolicited identifier data items received by data collection engine 212.

Configuration module 400 communicates with database 216, OPC server 132, event data collector 402, accumulator data collector 404, incident data collector 406 and identifier data collector 408. Configuration module 400 provides information regarding solicited data items to event data collector 402 and accumulator data collector 404 and the data needed for messages sent to message queue 414 to event data collector 402, accumulator data collector 404, incident data collector 406 and identifier data collector 408. This information is stored in database 216. Configuration module 400 also provides formatting information that data collection engine 212 needs to allow it to communicate with OPC server 132. It further acts as a data type relation module to relate the data items received from OPC server 132 to the appropriate data type and forward each data item to the appropriate data type module depending on the data type. This information is also stored in database 216. Further detail on configuration of system 200 is provided below.

Event data collector 402, accumulator data collector 404, incident data collector 406 and identifier data collector 408 communicate with timer module 410 and to message manager 412. Timer module 410 provides time information for records to be written to database 216. This information may be used as a trigger for initiating solicited data collection. Message manager 412, which communicates with message queue 414, inserts and updates messages to message queue 414 for event data, accumulator data, incident data and identifier data collected by event data collector 402, accumulator data collector 404, incident data collector 406 and identifier data collector 408, respectively.

Message queue 414 accumulates messages with instructions for inserting and updating records in database 216. Messages are received and processed in a first-in-first-out manner. Message queue 414 provides an interface between data collector 202 and database 216 which enables data collection engine 212 to dedicate itself to processing information form OPC server 132 without losing data. System 200 of the embodiment uses the MSMQ (trademark of Microsoft Corporation) software application included in the Microsoft Windows 2000 (trademark of Microsoft Corporation) operating system for message queue 414. It will be appreciated that other embodiments may use other software applications or other means of processing messages.

Queue manager 416, which communicates with message queue 414, processes each message from message queue 414 by creating a transaction on database 216. Each transaction either creates or updates a record in database 216. Queue manager 416 of the embodiment creates an SQL transaction for creating and updating records in database 216, however, it will be appreciated that other embodiments may use other methods of creating and updating records in database 216. Together message manager 412, message queue 414 and queue manager 416 create and format messages from data items collected from each data type module, queues such messages and update database 216 with the data contained in these messages. It will be appreciated that other embodiments may not queue such messages in message queue 414 but directly insert the records related to those messages in database 216.

It will be appreciated that other embodiments of system 200 may have different modules than those shown in the embodiment of FIG. 4 to provide collected data having the described time relationship to database 216.

Now, referring to FIG. 3, an example is provided illustrating the operation of system 200 as asset 104 processes parts. Timeline 300 indicates times $t_1$ to $t_{13}$ in the example, representing times from 7:00 to 8:10. PLC 106, which communicates with OPC server 132, has memory registers 110a to 110e to collect data from asset 104. Memory register 110a is used as a binary status switch indicating whether asset 104 has registered a fault for a particular condition. Signal 302 indicates the value of memory register 110a from times $t_1$ to $t_{13}$. In the example, data collection engine 212 does not process incident data but simply records the data as an incident. Memory register 110b collects an alphanumeric value indicating the batch number of parts processed by asset 104 which is identifier data. Separate batch numbers are represented by separate brackets 304a and 304b between times $t_1$ and $t_{13}$. Memory register 110c collects an alphanumeric value indicating the model number of parts processed by asset 104 which is also identifier data. The model number tracked in this example is represented by bracket 306 between times $t_1$ and $t_{13}$. Memory register 110d collects a numeric value indicating the number of parts processed by asset 104 in a time interval which is categorized as accumulator data. Time intervals for which accumulator data is recorded are represented by blocks 308a to 308i between times $t_1$ and $t_{13}$. Memory register 110e collects a numeric value indicating the temperature of a part processed by asset 104 at a given time categorized as event data. Times for which event data is recorded are represented by arrows 310a to 310d between times $t_1$ and $t_{13}$.

In the example, data collection engine 212 is configured to collect accumulator data from memory register 110d every ten minutes and event data from memory register 110e every twenty minutes.

At time $t_1$ in the example, memory register 110d begins to count the parts processed by asset 104 for the next time interval from 7:00 to 7:10. At time $t_2$, the value of two identifiers tracked by memory registers 110b and 110c change. OPC server 132 indicates this change to configuration module 400 by communicating at least one data item that includes the value of memory registers 110b and 110c. Configuration module 400 determines the data type of the data item(s) provided by OPC server 132 and provides this data to identifier data collector 408. Identifier data collector 408 then sends the data to message manager 412 which formats the data into a message to update database 216. In this case, message manager generates two messages to create a record for database 216, one record for each identifier recorded. Each message includes a time marker associated with the identifier. In this case, the time marker is provided by OPC server 132 since data collection was unsolicited by data collection engine 212. Each message also indicates the source, i.e. asset 104 from which the data item was collected, associated with the data item. Message manager 412 provides the two messages to message queue 414. Each message from message queue 414 is provided to queue manager 416 which creates a transaction on database 216, in this case inserting an identifier record for each message into database 216.

Additionally at time $t_2$, since system 200 had defined a relationship between identifier data and accumulator data, the change of the value of the identifier data causes accumulator data collector 404 to request data from memory register 110d to count the number of parts processed for the previous batch and model numbers in the time interval from $t_1$ to $t_2$, represented by block 308a. Accumulator data collector 404 then sends the data to message manager 412 which formats the data into a message to update database 216. In this case, message manager 412 generates a message to create a record for database 216 for the accumulator data collected. The message includes a time marker provided by OPC server 132 since data collection in this case was unsolicited by data collection engine 212 and source information indicating asset 104 from which the data item was collected. Message manager 412 provides the message to message queue 414 which is provided to queue manager 416. Queue manager 416 creates a transaction on database 216, in this case inserting an accumulator record into database 216.

At time $t_3$, memory register 110a changes from zero to one, shown by signal 302, indicating that asset 104 has registered a fault. OPC server 132 provides the data to configuration module 400 which provides the data to incident data collector 406. In this example, the incident data obtained indicates that a fault has occurred in asset 104. Incident data collector 406 sends the incident data to message manager 412 which formats the data into a message providing instructions to update database 216. In this case, message manager 412 generates a message to create a record for database 216 for the incident data obtained indicating that asset 104 is faulted. The message includes a time marker provided by OPC server 132 since data collection in this case was unsolicited by data collection engine 212 and source information indicating asset 104 from which the data item was collected. Message manager 412 provides the messages to message queue 414 which is provided to queue manager 416. Queue manager 416 creates a transaction on database 216, in this case creating an incident record for asset 104 for database 216.

At time $t_4$, timer module 410 indicates the expiry of the ten-minute interval, prompting accumulator data collector 404 to request data from memory register 110d. Configuration module 400 receives the request from accumulator data collector 404 and obtains the associated data stored in internal memory of OPC server 132 which was collected from memory register 110d. Accumulator data collector 404 then sends the data to message manager 412 which formats the data into a message to update database 216. In this case, message manager 412 generates a message to create a record for database 216 for the accumulator data collected. The message includes a time marker provided by timer module 410 since data collection in this case was solicited by data collection engine 212 and source information indicating asset 104 from which the data item was collected. Message manager 412 provides the message to message queue 414 which is provided to queue manager 416. Queue manager 416 creates a transaction on database 216, in this case inserting an accumulator record into database 216 for the number of processed parts in time interval from $t_2$ to $t_4$, represented by block 308b.

At time $t_5$, memory register 110a changes from one to zero, shown by signal 302. Data collection engine 212 processes the incident data similarly to the incident data obtained at time $t_3$ and determines that asset 104 is no longer faulted. Instead of posting a message to create a new record in database 216 for the incident, the message posted in message queue 414 indicates an update of the incident record already created for database 216 at time $t_3$ indicating an end time for the fault of asset 104.

At times $t_6$, $t_7$ and $t_8$, timer 412 indicates the expiry of ten-minute intervals to accumulator data collector 406, prompting it to request data stored in internal memory of OPC server 132 collected from memory register 110d representing the number of parts processed by asset 104. Data collection engine 212 creates a record for database 216 for the number of processed parts for blocks 308c, 308d and 308e obtained from memory register 110d at times $t_6$, $t_7$ and $t_8$, respectively, the same as at time $t_4$.

At times $t_6$ and $t_8$, timer 412 indicates the expiry of twenty-minute intervals to event data collector 402, prompting it to request data stored in internal memory of OPC server 132 collected from memory register 110e representing the temperature of the part processed by asset 104. As with solicited collection by accumulator data collector 404 at times $t_4$, $t_6$, $t_7$ and $t_8$, event data collector 402 requests and obtains stored event data collected from memory register 110e at those times, represented by arrows 310a and 310b. Event data collector 402 sends the data to message manager 412 which formats the data into a message to update database 216. In this case, message manager 412 generates a message to create a record for database 216 for the event data collected. The message includes a time marker provided by timer module 410 since data collection in this case was solicited by data collection engine 212 and source information indicating asset 104 from which the data item was collected. Message manager 412 provides the message to message queue 414 which is provided to queue manager 416. Queue manager 416 creates a transaction on database 216, in this case creating an event data record for database 216 for the temperature of the part processed by asset 104 at times $t_6$ and $t_8$, represented by arrows 310a and 310b, respectively.

Continuing with the example, at time $t_9$ the production line changes by starting a new batch number for the part processed by asset 104. As such, system 200 detects the change of value of memory register 110b. This change again causes data collection engine 212 to generate a message to create a record for the new identifier for database 216 and a message to create a record for the triggered collection of accumulator data for interval 308f. Additionally, identifier data collector 408 generates a message to be posted in message queue 414 to update the identifier record already created in database 216 at time $t_2$ with an end time.

Continuing with the example, the temperature of the part processed by asset 104 tracked by memory register 110e crosses a threshold at time $t_{10}$. PLC 106 to sends the value to data collection engine 212, represented by arrow 310c. Configuration module 400 receives the data from OPC server 132 and provides it to event data collector 402. Event data collector 402 then sends the data to message manager 412 which formats the data into a message to update database 216. In this case, message manager 412 generates a message to create a record for database 216 for the event data collected. The message includes a time marker provided by OPC server 132 since data collection in this case was unsolicited by data collection engine 212 and source information indicating asset 104 from which the data item was collected. Message manager 412 provides the message to message queue 414 which is provided to queue manager 416. Queue manager 416 creates a transaction on database 216, in this case inserting an event data record into database 216.

At time $t_{12}$, again timer module 410 indicates the expiry of a twenty-minute interval to event data collector 402, prompting it to request data from memory register 110e representing the temperature of the part processed by asset 104. Data collection engine 212 creates a record for database 216 recording the temperature of the part processed by asset 104 obtained from memory register 110e at time $t_{12}$, represented by arrow 310d.

At times $t_{11}$, $t_{12}$ and $t_{13}$, timer module 410 indicates the expiry of ten-minute intervals to accumulator data collector 404, prompting it to again request stored data collected from memory register 110d representing the number of parts processed by asset 104. Data collection engine 212 writes the number of processed parts in time intervals represented by blocks 308g, 308h and 308i at times $t_{11}$, $t_{12}$ and $t_{13}$, respectively, to database 216.

Figure 5:
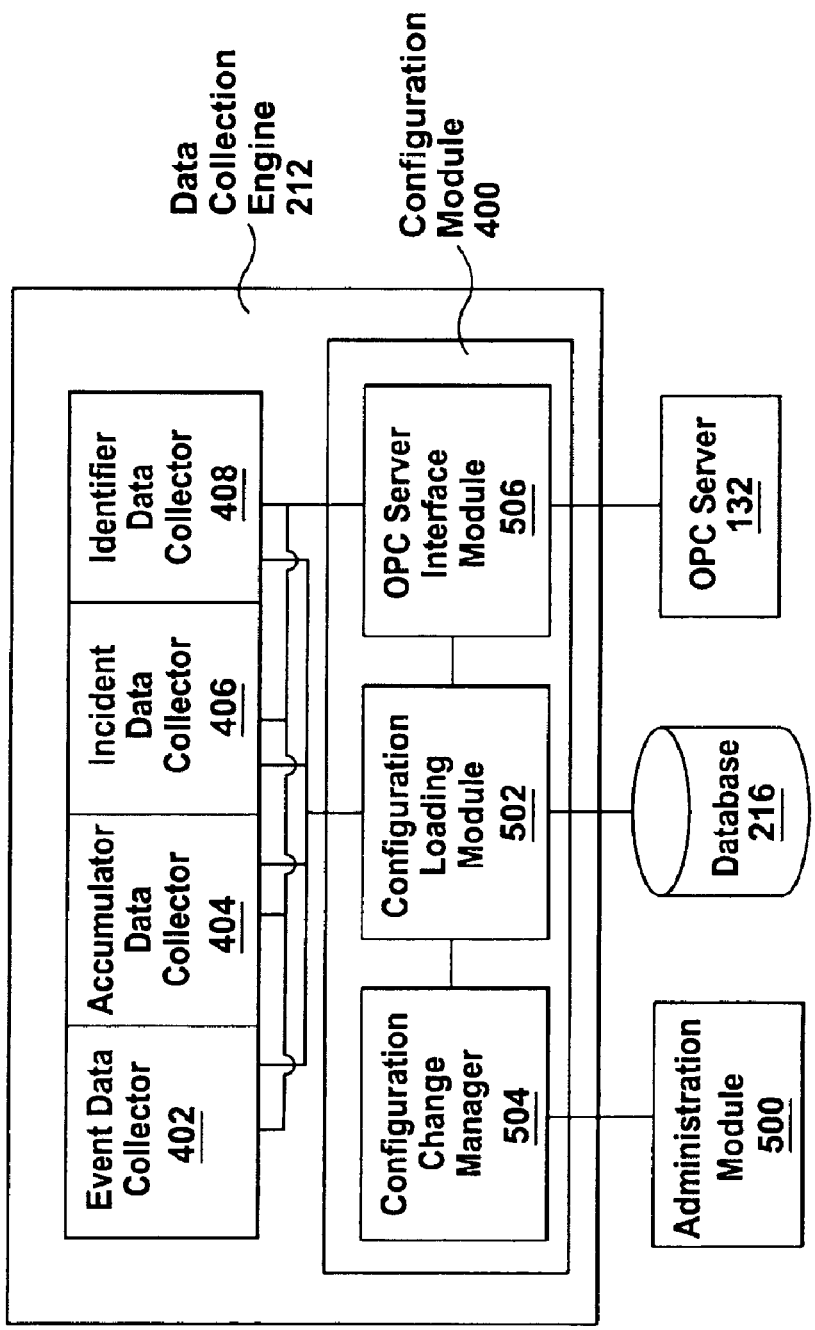
FIG. 5 is a block diagram of a portion of the system of FIG. 2 in greater detail.

Referring to FIG. 5, configuration of system 200 is provided in greater detail. System 200 includes administrator module 500 connected to configuration module 400 of data collection engine 212. Configuration module 400 further has configuration loading module 502, configuration change manager 504 and OPC server interface module 506. Administrator module 500 provides a user interface for an administrator to update the configuration of system 200. For example, an administrator can configure system 200 to collect additional data from a memory register 110. Configuration changes can include beginning or ceasing to gather data from a memory register 110, adding or deleting an asset 104 from plant floor 130, changing the format of data collected from an asset 104 and changing how often event or accumulator data items are solicited, among other things.

Configuration change manager 504 provides an interface between administrator module 500 and database 216 for receiving data entered by an administrator at administrator module 500. The data is loaded into database 216 by configuration loading module 502. Configuration loading module 502 also provides a mechanism for updating the other modules of data collection engine 212 with updated configuration data. Configuration loading module 502 communicates with any or all of event data collector 402, accumulator data collector 404, incident data collector 406 and identifier data collector 408 to update the configuration for data requested and received from OPC server 132. It also communicates with OPC server interface module 506. OPC server interface module 506 formats data for requesting and receiving data items from OPC server 132. Configuration loading module 502 provides OPC server interface module 506 with updated formatting data when necessary. An administrator can therefore change the configuration of system 200 of the embodiment by simply providing that information to administrator module 500 without having to disconnect data collection engine 212 or database 216 from PLCs 106. This allows for configuration changes while data is still being collected from PLCs 106, records are accumulated in database 216 and even when users are accessing the data stored in database 216.

As mentioned previously, OPC server 132 provides incident data to data collection engine 212 which may analyze the data and generate incident information based on the data. Incident data can be associated with a certain category of condition, for example, faults, warnings, alarms, etc. Multiple incident data records may be generated upon asset 104 recording a certain condition, however, system 200 can be configured to report only one incident at one time for a given category. For example, if system 200 is programmed to report on the fault status of asset 104 (fault category), when a fault occurs, several other fault incidents may also be generated at the same time. For example, if a conveyor belt has a condition of "stopped" and a processing element picking up elements from the conveyor belt has a condition of "empty", the first fault is a cause of an incident and the second fault is a symptom of the incident. Accordingly, a filtering process is provided in system 200 to generate only one incident at a time per category. This avoids overreporting of incidents when some incidents cause other incidents to occur at the same time. The filtering process is preferably done by having a ranking table which indicates which incident has priority for being reported when multiple incidents are reported. It will be appreciated that system 200 may still record incident data compiled for other categories such as warnings or alarms.

Specifically, incident data collector 406 filters incident data to report only one incident at a time per category. Once a memory register 110 associated with incident data changes value, incident data collector 406 obtains incident data from each memory register 110 in that category. Incident data collector 406 analyzes the value of each memory register 110 and determines which incident data should be analyzed to determine the active incident of asset 104. To do this, incident data collector 406 prioritizes the values received from each memory register 110 and chooses the most severe incident reported. In system 200 of the embodiment, incidents may be assigned the same priority as one another. Incident data collector 406 then chooses the first reported incident as the incident of asset 104.

Once incident data collector 406 determines the active incident for asset 104 based on the incident data, it determines whether the incident has changed. If the active incident has changed, incident data collector 406 generates and posts a message to message queue 414 to update the record in database 216 for the previous incident. A message is also posted to message queue 414 to create a record in database 216 for the new incident. If the active incident has not changed, incident data collector 406 does not post a message to message queue 414 to update a record in database 216 indicating the active incident of asset 104.

Figure 6:
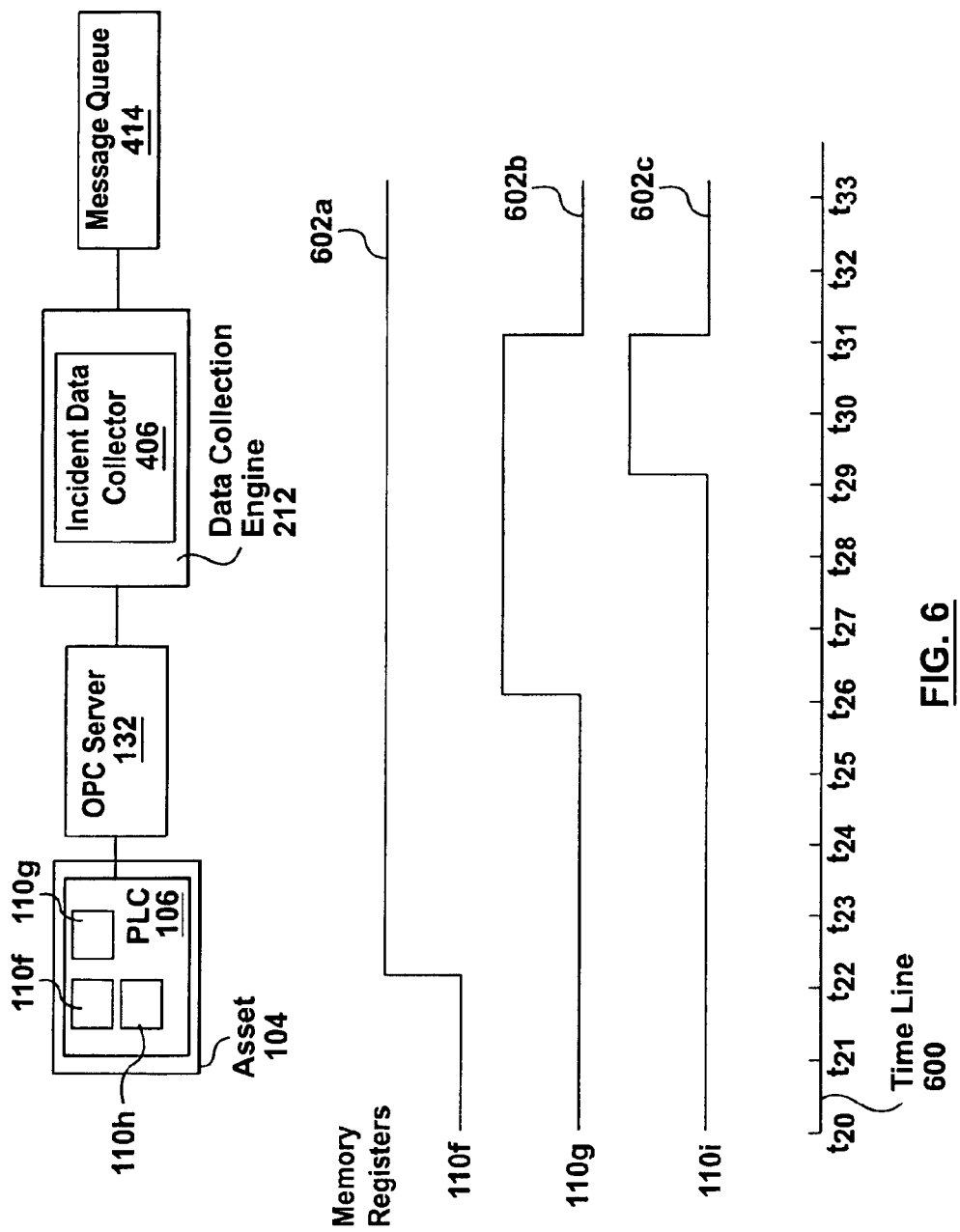
FIG. 6 is a graph illustrating an example of collecting incident data along a timeline with the system of FIG. 2.

Referring to FIG. 6, an example of determining the active incident of asset 104 for an incident category is provided. Timeline 600 demarks times from time $t_{20}$ to time $t_{33}$ for accumulating incident data. Asset 104 has memory registers 110f, 110g, and 110h that monitor for incident data in the same category between times $t_{20}$ and $t_{33}$. Memory register 110f is used as a binary status switch indicating whether asset 104 has registered a fault indicating that asset 104 is backed up. Incident data associated with memory register 110f has been configured as having a level 4 priority. Memory register 110g is used as a binary status switch indicating whether asset 104 has registered a fault indicating that asset 104 is jammed. Incident data associated with memory register 110g has been configured as having a level 2 priority. Memory register 110h is used as a binary status switch indicating whether asset 104 has registered a fault indicating that asset 104 has an access panel that is open.

Incident data associated with memory register 110*h* also has been configured as having a level 2 priority. Values of memory registers 110*f*, 110*g*, and 110*h* between times $t_{20}$ and $t_{33}$ are represented by signals 602*a*, 602*b* and 602*c*, respectively.

At times $t_{20}$ and $t_{21}$, memory registers 110*f*, 110*g*, and 110*h* all have a value of zero. Asset 104 is in its initial state of "running". At time $t_{22}$, memory register 110*f* records a value of one registering a fault indicating that it is backed up. Incident data collector 406 analyzes incident data from memory registers 110*f*, 110*g*, and 110*h*. Since memory register 110*f* is the only register indicating incident data, incident data collector 406 determines that the active incident for asset 104 is a "backed up" incident. A comparison with the previous active incident indicates an incident change for asset 104. Incident data collector 406 generates a message and posts it to message queue 414 to create a record for database 216 recording the start time of this incident at time $t_{22}$ and generates and posts a message to update the record indicating the previous "running" incident with an end time.

At time $t_{26}$, memory register 110*g* records a value of one, indicating asset 104 is jammed. Incident data collector 406 analyzes incident data from memory registers 110*f*, 110*g*, and 110*h*. Since, both memory registers 110*f* and 110*g* indicate incident data, incident data collector 406 determines the active incident of asset 104 based on priority. Incident data associated with memory register 110*g* has a higher priority than incident data associated with memory register 110*f*. Incident data collector 406 determines that the active incident for asset 104 has changed to "faulted-jammed". Incident data collector 406 generates and posts a message to message queue 414 to update the record posted at time $t_{22}$ to indicate the end time of the "backed up" state. Incident data collector 406 also generates and posts a message to create a record for database 216 indicating the start time of the "faulted-jammed" incident at time $t_{26}$.

For the example, it is presumed that at time $t_{29}$, a maintenance person begins to fix jammed asset 104 and opens an access panel for asset 104. Memory register 110*h* records a value of one, indicating that the access panel is open. Incident data collector 406 analyzes incident data from memory registers 110*f*, 110*g*, and 110*h*. Since, all memory registers 110*f*, 110*g*, and 110*h* indicate incident data, incident data collector 406 determines the active incident of asset 104 based on priority. Incident data associated with memory register 110*h* has a higher priority than incident data associated with memory register 110*f* but the same priority as incident data associated with memory register 110*g*. Since incident data collector 406 is configured to maintain the first reported incident, the active incident of asset 104 does not change from "faulted-jammed". No additional messages are generated for updating or creating records regarding incidents of asset 104.

At time $t_{31}$, the maintenance person has completed fixing asset 104. Memory register 110*g* indicates the jam has been fixed by changing value from one to zero. Memory register 110*h* indicates the access panel has been closed also by changing value from one to zero. Incident data collector 406 analyzes incident data from memory registers 110*f*, 110*g*, and 110*h*. Since memory register 110*f* is the only register indicating incident data, incident data collector 406 determines that asset 104 has changed active incidents to "backed up". Incident data collector 406 generates and posts a message to message queue 414 to create a record for database 216 recording the start time of this incident at time $t_{31}$. Incident data collector 406 also generates and posts a message to update the record in database created for the "faulted-jammed" incident by providing an end time for the incident.

Figure 7A:
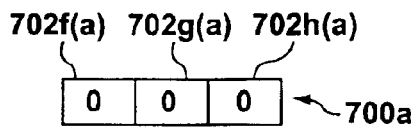
FIGS. 7A—D are block diagrams illustrating the values of an array for determining incident data along the timeline of the example of FIG. 6.
Figure 7B:
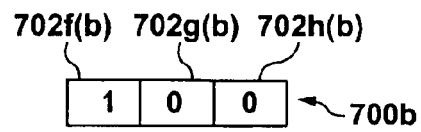
Figure 7C:
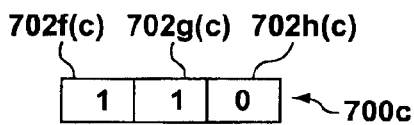
Figure 7D:
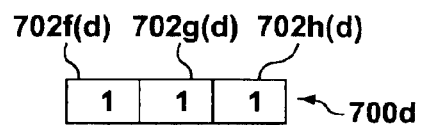

Incident data collector 406 of the embodiment of system 200 monitors changes in the active incident of asset 104 using an array containing incident data collected from memory registers 110. Each cell of the array represents a separate memory register 110 and the value of its associated memory register 110 is stored therein. Incident data collector 406 can determine the active incident of asset 104 based on the binary number represented by the array containing the incident data. For example, referring to FIGS. 7A-7D, array 700 contains cells 702*f*, 702*g* and 702*h*, holding incident data collected from memory registers 110*f*, 110*g* and 110*h*, respectively, from the example of FIG. 6. FIG. 7A depicts array 700 at time $t_{21}$, FIG. 7B depicts array 700 at time $t_{22}$, FIG. 7C depicts array 700 at time $t_{26}$ and FIG. 7D depicts array 700 at time $t_{29}$.

For the example, logic accessed by incident data collector 406 provides that binary number "000" (decimal 0) indicates the state "running", binary number "100" (decimal 4) indicates a "backed up" incident, binary numbers "010" or "110" (decimal 2 or 6) indicate a "faulted-jammed" incident, binary numbers "001" or "101" (decimal 1 or 5) indicate a "faulted-access panel open" incident. Additionally, "011" or "111" (decimal 3 or 7) can indicate either a "faulted-jammed" incident or a "faulted-access panel open" incident, depending on which incident is registered first as both incidents have the same priority. This logic and priority information is provided to incident data collector 406 through administrator module 500, configuration change manager 504 and configuration load module 502, as described previously. It will be appreciated that other embodiments may provide other incidents and other logic for determining the active incident.

Referring to FIG. 7A, the value of array 700 at time $t_{21}$ is "000" indicating a "running" incident. Referring to FIG. 7B, the value of array 700 at time $t_{22}$ is "100" indicating a "backed up" incident. Referring to FIG. 7C, the value of array 700 at time $t_{26}$ is "110" indicating a "faulted-jammed" incident. Referring to FIG. 7D, the value of array 700 at time $t_{29}$ is "111" which may indicate a "faulted-jammed" incident or a "faulted-access panel open" incident. In agreement with the example of FIG. 6, the "faulted-jammed" incident continues since it was first recorded.

System 200 of the embodiment also provides further granularity for obtaining accumulator data accrued since the end of the previous time interval for which the data was collected. This makes more current information available to managers monitoring plant floor 130 in real time. Further granularity is provided by storage of current accumulator data, separate from the records written to database 216 at the end of a regular time interval, which is continuously updated with new data at shorter time intervals. For example, system 200 requests accumulator data from a memory register 110 every five minutes. This information is stored in database 216. However, system 200 also requests accumulator data every minute from register 110 and stores the data in a record in database 216 by updating the existing record. It will be appreciated that other embodiments may use other methods for providing more recent data for viewing in real time.

Referring to FIGS. 8-11, detail is provided on table relationships associated with records stored in database 216. In the embodiment, records are stored as a series of related tables which may be accessed and processed using known SQL database queries. Each table relationship for each data type is described in turn.

Figure 8:
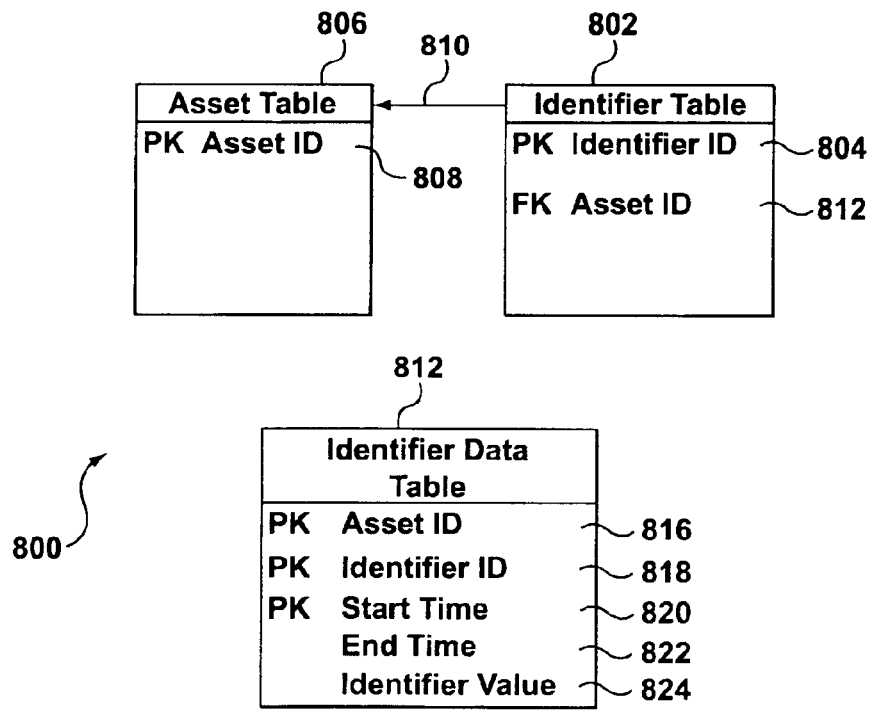
FIG. 8 is a block diagram of the identifier data table structure for the database of the system of FIG. 2.

First referring to FIG. 8, the table structure in database 216 for the configuration and recordation of identifier data is provided. Table structure 800 has Identifier Table 802, Asset Table 806 and Identifier Data Table 814. Identifier Table 802 and Asset Table 806 provide the configured identifiers for the assets 104 connected to system 200. Asset Table 806 includes a record for each of the assets 104 connected to system 200 identified by the value of AssetID field 808. Asset Table 806 has AssetID field 806 as its primary key.

Identifier Table 802 includes a record for each of the identifiers for each of the assets 104 connected to system 200 identified by the value of IdentifierID field 804. This table also includes AssetID field 812 to identify the asset 104 with which each memory register 110 collecting identifier data is associated. Identifier Table 802 has IdentifierID field 804 as its primary key. Identifier Table 802 is joined to Asset Table 806 by AssetID field 812 in Identifier Table 802 and AssetID field 808 in Asset Table 806. The many-to-one relationship is indicated by relationship arrow 810.

System 200 stores collected identifier data in Identifier Data Table 814, one record for each combination of asset 104, identifier and collection period. Accordingly, Identifier Data Table 814 has a compound primary key consisting of AssetID field 816, IdentifierID field 818 and StartTime field 820. Since identifier data is connected with a time interval, Identifier Data Table 814 also has EndTime field 822 to record the end time of the time interval associated with the specific identifier. Identifier data therefore can be linked to event data, accumulator data and incident data based on time intervals demarked by the value of StartTime field 820 and EndTime field 822. Identifier Data Table 814 also has IdentifierValue field 824 to record the numeric or alphanumeric value of the identifier associated with this record.

Figure 9:
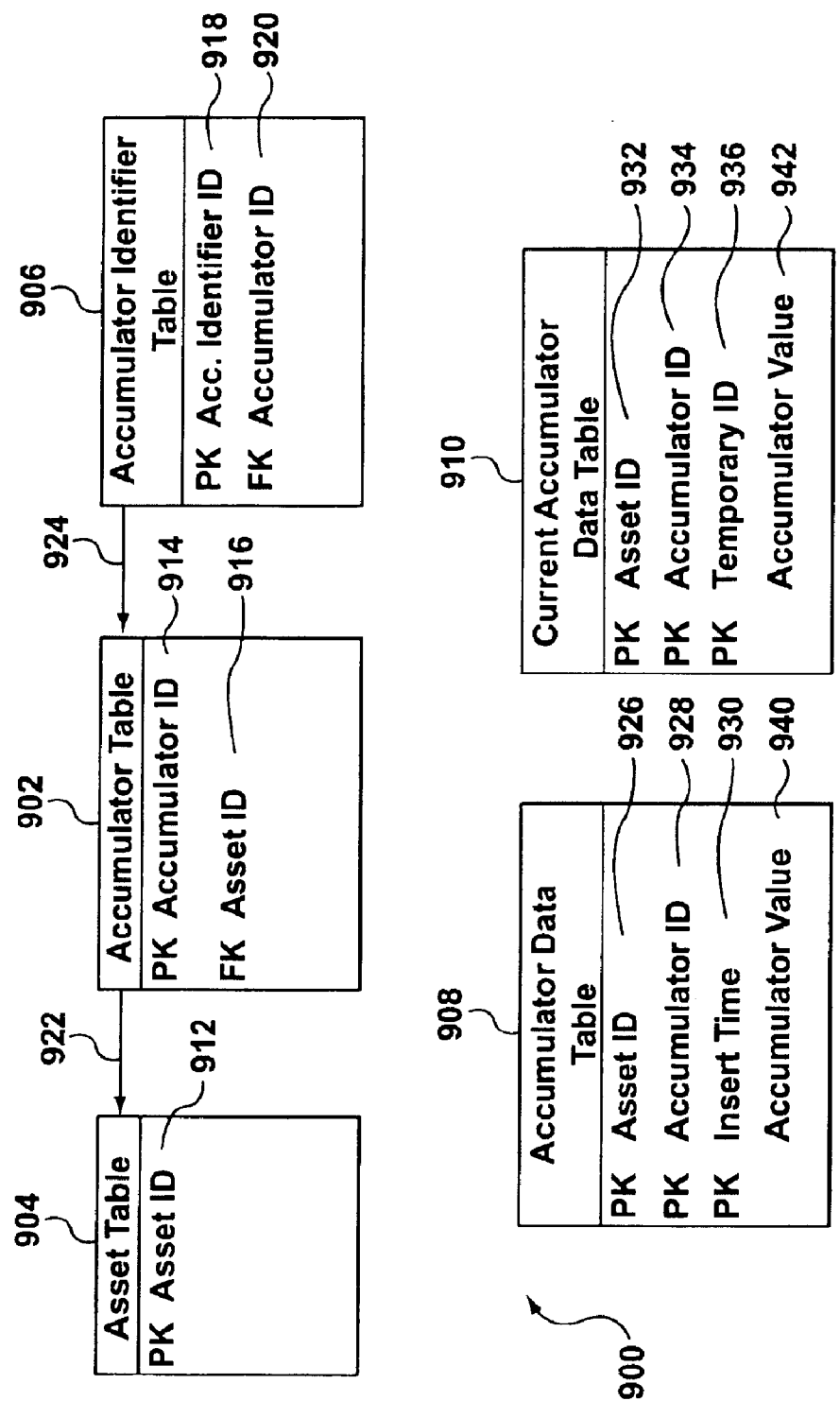
FIG. 9 is a block diagram of the accumulator data table structure for the database of the system of FIG. 2.

Second, referring to FIG. 9, the table structure in database 216 for the configuration and recordation of accumulator data is provided. Table structure 900 has Accumulator Table 902, Asset Table 904, Accumulator Identifier Table 906, Accumulator Data Table 908 Current Accumulator Data Table 910. Accumulator Table 902, Asset Table 904 and Accumulator Identifier Table 906 provide the configuration for the collected accumulator data for assets 104 connected to system 200. Asset Table 904 includes a record for each of the assets 104 connected to system 200 identified by the value of AssetID field 912. Asset Table 904 has AssetID field 912 as its primary key.

Accumulator Table 902 includes a record for all of the possible identifiers for each of the assets 104 connected to system 200 identified by the value of AccumulatorID field 914. This table also includes AssetID field 916 to identify the asset 104 with which each memory register 110 collecting accumulator data is associated. Accumulator Table 902 has AccumulatorID field 914 as its primary key. Accumulator Table 914 is joined to Asset Table 904 by AssetID field 916 in Accumulator Table 902 and AssetID field 912 in Asset Table 904. The many-to-one relationship is indicated by relationship arrow 922.

Accumulator Identifier Table 906 includes a record for all of the possible relationships between identifiers and memory registers 110 collecting accumulator data in system 200 identified by the value of AccIdentifierID field 918. This table also includes AccumulatorID field 920 to identify the memory register 110 collecting accumulator data with which each relationship is associated. Accumulator Identifier Table 906 has AccIdentifierID field 918 as its primary key. Accumulator Identifier Table 906 is joined to Accumulator Table 914 by AccumulatorID field 920 in Accumulator Identifier Table 906 and AccumulatorID field 914 in Accumulator Table 914. The many-to-one relationship is indicated by relationship arrow 924.

System 200 stores collected accumulator data in Accumulator Data Table 908, one record for each combination of asset 104, memory register 110 collecting accumulator data and collection time. Accordingly, Accumulator Data Table 908 has a compound primary key consisting of AssetID field 926, AccumulatorID field 928 and InsertTime field 930. Accumulator data therefore can be linked to identifier data, event data and incident data based on time at which data was collected, recorded in InsertTime field 930. Accumulator Data Table 908 also has AccumulatorValue field 940 recording the value obtained from its associated memory register 110.

System 200 also stores collected accumulator data in between the regular time intervals, as described above, in Current Accumulator Data Table 910, one record for each combination of asset 104, memory register 110 collecting accumulator data and temporary identifier. The temporary identifier tags the appropriate record so newly collected accumulator data from the same memory register 110 updates the appropriate record. Accordingly, Current Accumulator Data Table 910 has a compound primary key consisting of AssetID field 932, AccumulatorID field 934 and TemporaryID field 936. Current Accumulator Data Table 910 also has AccumulatorValue field 942 recording the value obtained from memory register 110.

Each update of accumulator data in system 200 of the embodiment is written over existing data in Current Accumulator Data Table 910 by an update transaction on an existing record in this table in database 216. Therefore, without a change of identifier in a time interval for collecting accumulator data, only one accumulator record is stored in Current Accumulator Data Table 910 containing the accumulator data from the beginning of the interval to the last update. At the end of the time interval for collecting accumulator data, system 200 inserts an accumulator record into Accumulator Data Table 908 and clears the records from Current Accumulator Data Table 910, replacing them with a set of empty records, one for each memory register 110 collecting accumulator data.

As described previously, accumulator data and identifier data have a pre-set relationship in system 200 such that, if the identifier changes in a time interval for collecting accumulator data, system 200 collects accumulator data to update the accumulator record in Current Accumulator Data Table 910. Accumulator data collected after this time is recorded in a separate record inserted into Current Accumulator Data Table 910. This new accumulator record is updated until the end of the time interval. In this case, at the end of the time interval, system inserts two accumulator records into Accumulator Data Table 908, one representing accumulator data corresponding to the old identifier and another representing accumulator data corresponding to the new identifier. System 200 again clears the records from Current Accumulator Data Table 910, replacing them with a set of empty records, one for each memory register 110 collecting accumulator data.

Figure 10:
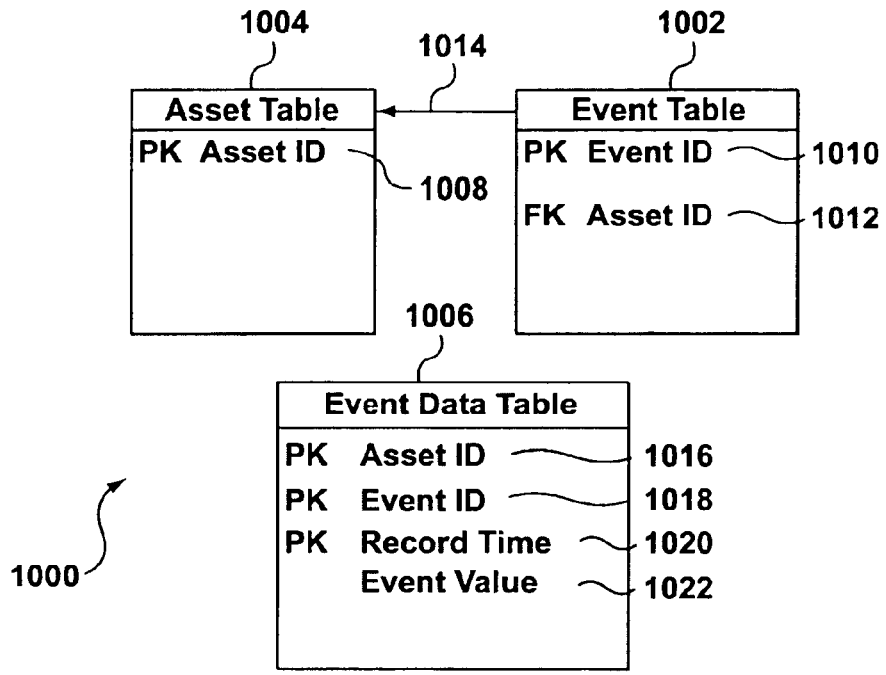
FIG. 10 is a block diagram of the event data table structure for the database of the system of FIG. 2.

Next, referring to FIG. 10, the table structure in database 216 for the configuration and recordation of event data is provided. Table structure 1000 has Event Table 1002, Asset Table 1004 and Event Data Table 1006. Event Table 1002 and Asset Table 1004 provide the configuration for event data for the assets 104 connected to system 200. Asset Table 1004 includes a record for each of the assets 104 connected to system 200 identified by the value of AssetID field 1008. Asset Table 1004 has AssetID field 1008 as its primary key.

Event Table 1002 includes a record for all of the possible memory registers 110 collecting event data for each of the assets 104 connected to system 200 identified by the value of EventID field 1010. This table also includes AssetID field 1012 to identify the asset 104 with which each memory register 110 collecting event data is associated. Event Table 1002 has EventID field 1010 as its primary key. Event Table 1002 is joined to Asset Table 1004 by AssetID field 1012 in Event Table 1002 and AssetID field 1008 in Asset Table 1004. The many-to-one relationship is indicated by relationship arrow 1014.

System 200 stores collected event data in Event Data Table 1006, one record for each combination of asset 104, memory register 110 collecting event data and collection period. Accordingly, Event Data Table 1006 has a compound primary key consisting of AssetID field 1016, EventID field 1018 RecordTime field 1020 and EventValue field 1022. Event data therefore can be linked to identifier data, accumulator data and incident data based on time at which data was collected, recorded in RecordTime field 1020.

Figure 11:
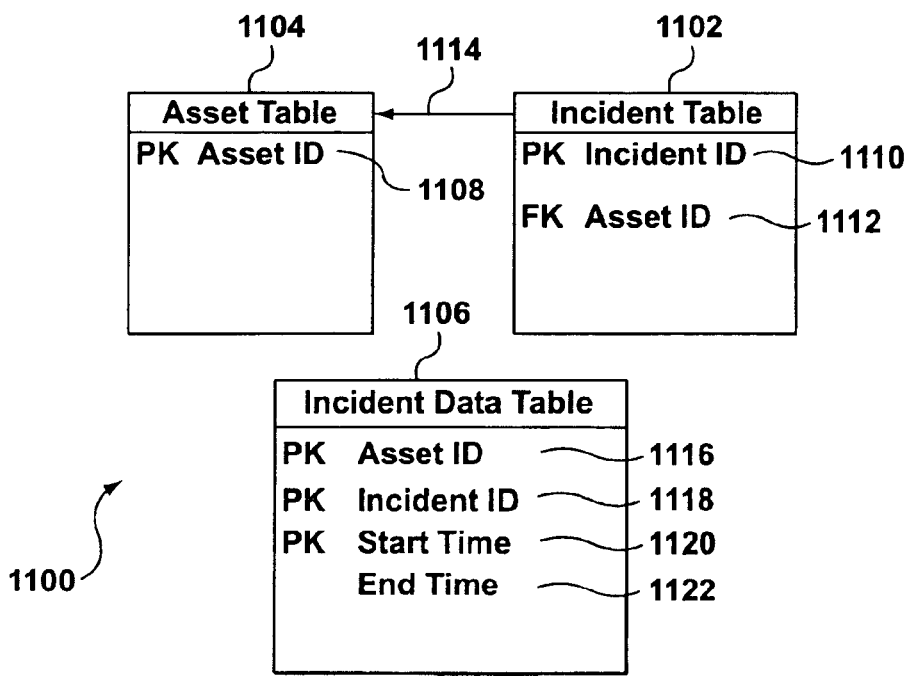
FIG. 11 is a block diagram of the incident data table structure for the database of the system of FIG. 2.

Finally, referring to FIG. 11, the table structure in database 216 for the configuration and recordation of incident data is provided. Table structure 1100 has Incident Table 1102, Asset Table 1104 and Incident Data Table 1106. Incident Table 1102 and Asset Table 1104 provide the configuration for incident data for the assets 104 connected to system 200. Asset Table 1104 includes a record for each of the assets 104 connected to system 200 identified by the value of AssetID field 1108. Asset Table 1104 has AssetID field 1108 as its primary key.

Incident Table 1102 includes a record for each memory register 110 collecting incident data for each of the assets 104 connected to system 200 identified by the value of IncidentID field 1110. This table also includes AssetID field 1112 to identify the asset 104 with which each incident is associated. Incident Table 1102 has IncidentID field 1110 as its primary key. Incident Table 1102 is joined to Asset Table 1104 by AssetID field 1112 in Incident Table 1102 and AssetID field 1108 in Asset Table 1104. The many-to-one relationship is indicated by relationship arrow 1114.

System 200 stores collected incident data in Incident Data Table 1106, one record for each combination of asset 104, incident and collection period. Accordingly, Event Data Table 1106 has a compound primary key consisting of AssetID field 1116, IncidentID field 1118 and StartTime field 1120. Since incidents are connected with a time interval, Incident Data Table 1106 also has EndTime field 1122 to record the end time of the time interval associated with the specific incident. Incidents therefore can be linked to event data, accumulator data and identifier data based on time intervals demarked by the value of StartTime field 1120 and EndTime field 1122.

As a table structure is used, the data can be accessed and filtered using SQL queries. It will be appreciated that other embodiments may provide different table relationships for database 216. It will also be appreciated that other embodiments contemplating different data types will provide different table relationships for database 216.

It will further be appreciated that when generating queries for system 200, when a start time, end time or duration is identified for the query, the corresponding record retrieved from the database, may have time records which do not necessarily fully overlap with the time boundaries defined in the query. For example if a query requests results starting from a certain time and ending at a certain end time, the system has sufficient flexibility to consider and report not only data which meets the identifier criteria and which is strictly contained within the defined times, but also which meets the criteria and which meets just one of the time criteria. For example, for data which meets the identifier criteria and the start time criteria, but does not meet the end time criteria (at its end time to past the cited end time), the system is flexible enough to provide the data to the results, if needed. Similar flexibilities exist for the other parameters used by the system, such as the source field.

Once system 200 collects data into Identifier Data Table 814, Accumulator Data Table 908, Event Data Table 1106 and Incident Data Table 1106, users can run reports on this data using an output module. The data can then be associated and displayed in a meaningful manner and used to better manage plant floor 130. To provide the reports, terminal 120 connects to data display module 226 connected to database 216. Data display module 226 of system 200 of the embodiment is a client-side output module with a graphical user interface that enables users to perform database queries the results of which are dynamically displayed in a web browser such as Microsoft Internet Explorer (trademark of Microsoft Corporation). It will be appreciated that there are numerous other methods for retrieving data and displaying data so retrieved from database 216.

To display information from database 216, a user chooses one or more asset(s) 104 from an interface on terminal 120 for which data is to be displayed along with which data items to display and for which time interval. System 200 can be configured to alternatively display data items for an individual asset 104 or for several assets 104 that are grouped together, for example, all assets 104 in a particular department or production line. Once the user chooses an asset 104 or group of assets 104, he or she chooses the data items to display that are relevant for that asset 104 or group of assets 104 and the time interval.

Figure 12:
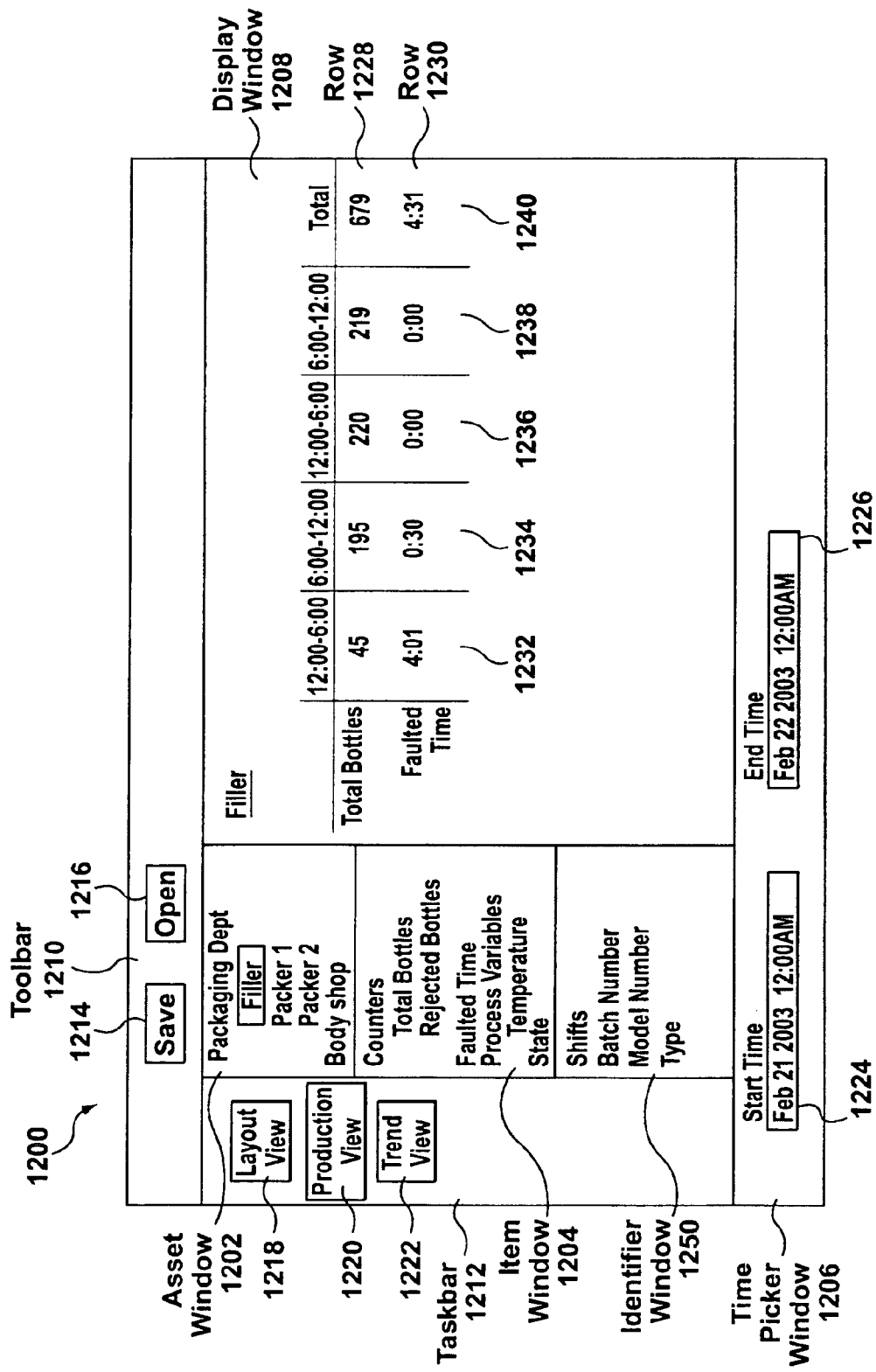
FIG. 12 is a block diagram of a window for displaying an exemplary report based on data collected in the database of the system of FIG. 2.

Referring to FIG. 12, the data display module 226 typically presents a window on terminal 120, such as window 1200, to the user for choosing the asset(s) 104, data items and time intervals. Window 1200 accordingly has asset window 1202, item window 1204, time picker window 1206 and display window 1208 as well as toolbar 1210 and taskbar 1212. Asset window 1202 presents the assets 104 and groups of assets 104 to the user. Item window 1204 presents the data items that are collected for the asset(s) 104 chosen. Time picker window 1206 provides an interface for the user to choose the appropriate time interval. Display window 1208 provides an area for display of the information requested by the user. Toolbar 1210 provides commonly used software tools such as a save function, indicated by button 1214, and an open function, indicated by button 1216. Taskbar 1212 provides report types common used by system 200, such as layout view, indicated by button 1218, production view, indicated by button 1220, and trend view, indicated by button 1222. The interface used by data display module 226, window 1200, to communicate with the user is customizable as to the content of displayed windows and toolbar and taskbar items, among other things. It will be appreciated that there are numerous other methods for interacting with the user and displaying information to the user.

In the exemplary window 1200 shown in FIG. 12, display window 1208 shows data for a filler machine filling milk bottles in the packaging department at a dairy. Accordingly, asset window 1202 shows the asset corresponding to the filler machine highlighted. Item window 1204 therefore shows data items that can be displayed for the filler asset. Time picker window 1206 shows that the user has chosen the time interval starting on Feb. 21, 2003 at 12:00 am, indicated in start time window 1224, and ending on Feb. 22, 2003 at 12:00 am, indicated in end time window 1226. In this example, the user wants to display the number of bottles processed in each six hour period and the amount of faulted time in display window 1208.

To display the data in display window, the user indicates the data to be displayed. Data display module 226 formats this information into a query for database 216 to retrieve the data. The query uses the time indicated by the user in time picker window 1206 to retrieve the appropriate data since each record is associated with a time marker or time interval.

The retrieved data is displayed in two rows, row 1228 for bottles processed and row 1230 for faulted time, and in five columns 1232 to 1240, columns 1232 to 1238 representing six hour time intervals and column 1240 representing totals for the 24 hour time interval. As the data shows, the user can see that fewer bottles were processed in the first six hours (column 1232, row 1228) but can also see that the associated time interval had four hours of faulted time (column 1232, row 1230).

Figure 13:
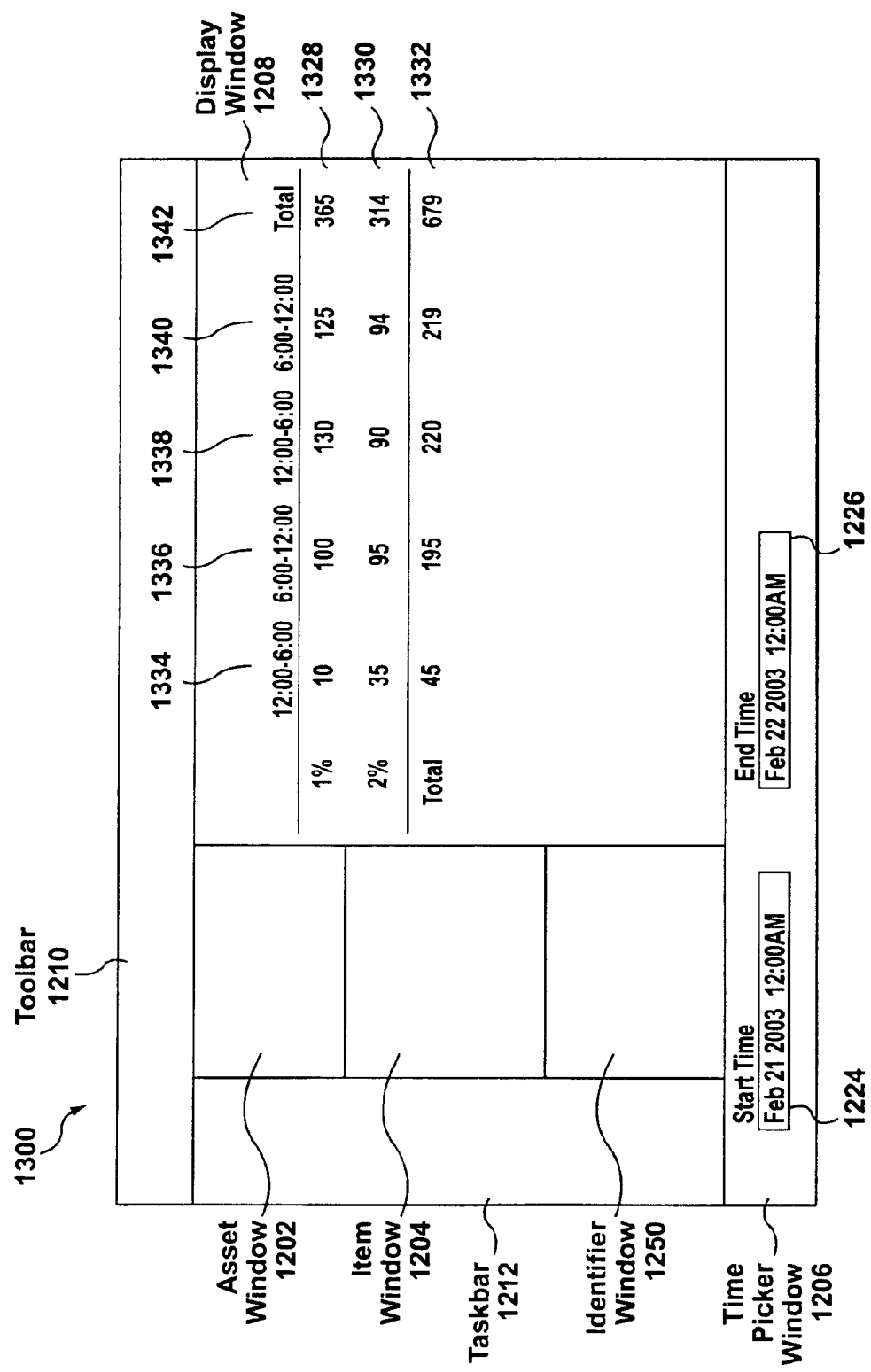
FIG. 13 is a block diagram of a window for displaying another exemplary report based on data collected in the database of the system of FIG. 2.

The user also can use identifiers as filters to break data out into data associated with different identifiers. Referring to FIG. 13, window 1300 shows an example of a user breaking down the number of bottles produced by type of milk with which bottles are filled, one type being 1% milk and another type being 2% milk. As with window 1200, window 1300 has asset window 1202, item window 1204, time picker window 1206 and display window 1208 as well as toolbar 1210 and taskbar 1212.

Again time picker window 1206 shows that the user has chosen the time interval starting on Feb. 21, 2003 at 12:00 am, indicated in start time window 1224, and ending on Feb. 22, 2003 at 12:00 am, indicated in end time window 1226. In this example, the user wants to display the number of bottles processed in each six hour period for each type and the total number of bottles processed in display window 1208.

To display the data in display window, the user indicates the data to be displayed. Data display module 226 formats this information into a query for database 216 to retrieve the data. The query uses the time indicated by the user in time picker window 1206 to retrieve the appropriate data since each record is associated with a time marker or time interval. The query also uses the asset 104 or group of assets 104 chosen to associate the data, in this case the filler machine, to retrieve the appropriate data.

The retrieved data is displayed in three rows, row 1328 for 1% milk, row 1330 for 2% milk, and row 1332 for total bottles processed, and in five columns 1334 to 1342, columns 1334 to 1340 representing six hour time intervals and column 1342 representing totals for the 24 hour time interval. As the data shows, the user can see that how many bottles were processed for each type.

In addition to these query methods using time picker window 1206 in FIGS. 12 and 13, the user can also indicate time intervals by choosing an identifier. This is possible since identifiers each have a start time and an end time. Queries to database 216 would therefore retrieve the appropriate records covered by the time interval associated with the identifier and asset 104 or group of assets 104 chosen. This gives the user the ability to produce reports based on a shift, for example, if the shift has been configured in the system as an identifier.

It will be appreciated that data display module 226 may comprise other views and windows that allow the user to select the data to be displayed and to display the data retrieved from database 216.

It will be appreciated that data collector 202 can be embodied in computer software, computer hardware, firmware, among other things or combinations thereof.

It is noted that those skilled in the art will appreciate that various modifications of detail may be made to the present embodiment, all of which would come within the scope of the invention.

We claim:

1. A method of processing data relating to conditions in a manufacturing process, said data being relateable to one of a plurality of data types, said method comprising:

relating a first data item of said data to a first data type of said plurality of data types;

associating said first data item with a first time marker;

associating said first data item with a source in said manufacturing process;

associating said first data item with an identifier, said value of said identifier being capable of being one of a set of a plurality values, each said value in said set relating to a condition of said conditions, said set being expandable during operation of said manufacturing process;

relating a second data item of said data to a second data type of said plurality of data types;

associating a second data item with a second time marker;

associating said second data item with a source in said manufacturing process; and upon a receiving a request, associating said value of said identifier associated with said first data item with said second data item if:

said first time marker associated with said first data item corresponds to said second time marker associated with said second data item; and said source associated with said first data item corresponds to said source associated with said second data item, wherein said value of said identifier indicates one of:

a) identity of an article processed during a first time interval indicated by said first time marker; and b) a status of said manufacturing process during said first time interval indicated by said first time marker.

2. The method as claimed in claim 1, wherein, when said value of said identifier indicates said article processed during said first time interval, said article is one of:

a1) a part processed;

a2) a batch of parts processed; and a3) a model processed.

3. The method as claimed in claim 1, wherein, when said value of said identifier indicates status of said manufacturing process during said first time interval, said status is a shift identifier identifying a particular work shift in which parts are processed.

4. The method as claimed in claim 1, wherein said first time marker indicates a start time for said first time interval.

5. The method as claimed in claim 4, wherein said first time marker further indicates an end time for said first time interval, said start time and said end time indicating a duration of said first time interval.

6. The method as claimed in claim 5, wherein said second time marker indicates one of a point in time and a second time interval.

7. The method as claimed in claim 6, wherein said second time marker is said point in time and said first time marker corresponds to said second time marker if said point in time occurs within said first time interval.

8. The method as claimed in claim 6, wherein said second time marker is said second time interval and said first time marker corresponds to said second time marker if at least a portion of said second time interval occurs within said first time interval.

9. The method as claimed in claim 6, wherein said second data type is one of:
   a) an accumulator data type, said second time marker is said second time interval and said method further comprises the step of associating said second data item with an accumulator value, said accumulator value relating to a count for said second time interval;
   b) an event data type, said second time marker is said point in time and said method further comprises the step of associating said second data item with an event value, said event value relating to a process variable for said point in time; and
   c) an incident data type, said second time marker is said second time interval and said method further comprises the step of associating said second data item with an incident value, said incident value relating to an incident occurring in said second time interval.

10. The method as claimed in claim 9, wherein said second data type is an incident data type and said method further comprises the step of associating a priority level to said incident value to prioritize said second data item against another data item of said second data type associated with data relating to a condition in said manufacturing process.

11. The method as claimed in claim 6, wherein said source is one of a machine, a portion of a machine and a group of machines in said manufacturing process.

12. The method as claimed in claim 11, said method further comprising the step of storing said first data item and said second data item in a database prior to requesting said association between said value of said identifier and said second data item.

13. The method as claimed in claim 12, wherein said first data item and said second data item are stored as records in tables in said database.

14. The method as claimed in claim 13, wherein said first data type further provides a link to another data type of said plurality of data types to allow data in said another data type to be associated with data in said first data type.

15. The method as claimed in claim 14, said method further comprising the step of, in response to said request, accessing said database using SQL queries to associate said value of said identifier and said second data item upon receiving said request.

16. The method as claimed in claim 15, said method further comprising the step of dynamically displaying association of said value of said identifier with said second data item on a graphical user interface connected to said database upon receiving said request.

17. The method as claimed in claim 16, said method further comprising the step of collecting said data relating to said first data item and said second data item by at least one Programmable Logic Controller in said manufacturing process.

18. The method as claimed in claim 17, said method further comprising the step of collecting said data from said Programmable Logic Controller and formatting said data prior to relating said first data item and said second data item to said first data type and said second data type respectively.

19. A system for processing data relating to conditions in a manufacturing process, said data being relateable to one of a plurality of data types, said system comprising:
   a data type relation module adapted to receive a first data item of said data and a second data item of said data and to relate said first data item to a first data type of said plurality of data types and said second data item to a second data type of said plurality of data types;
   a first data type module adapted to receive said first data item from said data type relation module, to associate said first data item with (i) a first time marker, (ii) a source in said manufacturing process and (iii) an identifier, said value of said identifier to be one of a set of a plurality values relating to a condition of said conditions, said set being expandable during operation of said manufacturing process, said first data type module further adapted to process said set when expanded;
   a second data type module adapted to receive said second data item from said data type relation module and to associate a second data item with a second time marker and a source in said manufacturing process;
   a database adapted to communicate with said first data type module and said second data type module and to store said first data item and said second data item; and
   an output module connected to said database adapted to receive a request and to associate said value of said identifier associated with said first data item with said second data item if:
      said first time marker associated with said first data item corresponds to said second time marker associated with said second data item; and
      said source associated with said first data item corresponds to said source associated with said second data item,
   wherein said value of said identifier indicates one of:
      a) identity of an article processed during a first time interval indicated by said first time marker; and
      b) a status of said manufacturing process during said first time interval indicated by said first time marker.

20. The system as claimed in claim 19, wherein, when said value of said identifier indicates said article processed during said first time interval, said article is one of:
   a1) a part processed;
   a2) a batch of parts processed; and
   a3) a model processed.

21. The system as claimed in claim 19, wherein, when said value of said identifier indicates status of said manufacturing process during said first time interval, said status is a shift identifier identifying a particular work shift in which parts are processed.

22. The system as claimed in claim 19, wherein said first time marker indicates a start time for said first time interval.

23. The system as claimed in claim 22, wherein said first time marker further indicates an end time for said first time interval, said start time and said end time indicating a duration of said first time interval.

24. The system as claimed in claim 23, wherein said second time marker indicates one of a point in time and a second time interval.

25. The system as claimed in claim 24, wherein said second time marker is said point in time and said first time marker corresponds to said second time marker if said point in time occurs within said first time interval.

26. The system as claimed in claim 24, wherein said second time marker is a second time interval and said first time marker corresponds to said second time marker if at least a portion of said second time interval occurs within said first time interval.

27. The system as claimed in claim 24, wherein said second data type is one of:
   a) an accumulator data type, said second time marker is said second time interval and said second data type module is further adapted to associate said second data item with an accumulator value, said accumulator value relating to a count for said second time interval;
   b) an event data type, said second time marker is said point in time and said second data type module is further adapted to associate said second data item with an event value, said event value relating to a process variable for said point in time; and
   c) an incident data type, said second time marker is said second time interval and said second data type module is further adapted to associate said second data item with an incident value, said incident value relating to an incident occurring in said second time interval.

28. The system as claimed in claim 27, wherein said second data type is an incident data type and said second data type module is further adapted to associate a priority level to said incident value to prioritize said second data item against another data item of said second data type associated with data relating to a condition in said manufacturing process.

29. The system as claimed in claim 24, wherein said source is one of a machine, a portion of a machine and a group of machines in said manufacturing process.

30. The system as claimed in claim 29, said system further comprising a record formatting module for communication of said database with said first data type module and said second data type module, said record formatting module adapted to receive said first data item and said second data item from said first data type module and said second data type module, to format each of said first data item and said second data item into a message for inserting a database record into said database and to insert each said database record formed from said first data item and said second data item into a table in said database.

31. The system as claimed in claim 30, wherein said record formatting module comprises a first message manager adapted to receive said first data item and said second data item from said first data type module and said second data type module and to format each of said first data item and said second data item into a message for inserting a database record into said database and a second message manager adapted to insert each said database record formed from said first data item and said second data item into a table in said database.

32. The system as claimed in claim 31, wherein said record formatting module further comprises a message queue connected to said first message manager and said second message manager, said message queue adapted to queue messages received from said first message manager and said second message manager is further adapted to retrieve each said message queued in said message queue for insertion of said database record associated therewith into said table in said database.

33. The system as claimed in claim 32, wherein said output module is adapted to access said database using SQL queries to associate said value of said identifier and said second data item upon receiving said request.

34. The system as claimed in claim 33, wherein said output module includes a graphical user interface connected to said database adapted to dynamically display association of said value of said identifier with said second data item on upon receiving said request.

35. The system as claimed in claim 34, wherein said graphical user interface is adapted to obtain an input from a user of said system regarding said request and to format said association of said value of said identifier with said second data item in a report for display to said user.

36. The system as claimed in claim 35, said system further comprising at least one Programmable Logic Controller adapted to collect and to forward said data relating to said first data item and said second data item to said data type relation module.

37. The system as claimed in claim 36, said system further comprising an OLE for Process Control server adapted to receive said data from said at least one Programmable Logic Controller and to format said data for said data type relation module.

38. The system as claimed in claim 19, wherein said database contains configuration regarding collection parameters for said data relating to said conditions in said manufacturing process and said system further comprises a configuration management module communicating with said database, said configuration management module adapted to receive an input for independently changing one collection parameter of said collection parameters and adapted to update said one collection parameter in said database while said system is operating.

39. The system as claimed in claim 38, wherein said configuration management module is further adapted to update said one collection parameter while said output module is operating to receive said request and associate said value of said identifier with said second data item.

40. A system for processing data relating to conditions in a manufacturing process, said data being relateable to a plurality of data types including an identifier data type, an accumulator data type, an event data type and an incident data type, each data type of said plurality of data types including an association with a time marker and a source in said manufacturing process, said system comprising:
   a data type relation module adapted to receive said data and to process said data into one data type of said plurality of data types;
   an identifier data type module adapted to receive said data from said data type relation module if said data is related to said identifier data type, to associate a value of an identifier associated with said identifier data type with one value of a plurality values in a set relating a selection of said conditions to said identifier date type, to allow expansion of said set during operation of said manufacturing process, to process said set when expanded and to prepare said data for storage;
   an accumulator data type module adapted to receive said data from said data type relation module if said data is related to said accumulator data type and to prepare said data for storage;
   an event data type module adapted to receive said data item from said data type relation module if said data is related to said event data type and to prepare said data for storage; and
   an incident data type module adapted to receive said data item from said data type relation module if said data is related to said incident data type and to prepare said data for storage;

a data processing module adapted to receive said data for storage from each of said identifier, accumulator, event and incident data type modules and for generating a request to store said data for storage;

a database adapted to receive said request and to store said data for storage related to said request in a data structure; and an output module adapted to receive a query relating to identifying data associated with said identifier data type and to process said query by associating a value of an identifier associated with said identifying data with a second data item, said second data item being one of said accumulator, event and incident data types, if:

a time marker associated with said identifying data corresponds to a time marker associated with said second data item; and a source associated with said identifying data corresponds to a source associated with said second data item, wherein said value of said identifier indicates one of:

a) an identity of an article processed during an identifying time interval associated with a time marker related to said identifying data; and b) a status of said manufacturing process during said identifying time interval.

* * * * *